(12) United States Patent
Sawa et al.

(10) Patent No.: US 6,224,820 B1
(45) Date of Patent: May 1, 2001

(54) METHOD OF PRODUCING A REDUCED METAL, AND TRAVELING HEARTH FURNACE FOR PRODUCING SAME

(75) Inventors: Yoshitaka Sawa; Tetsuya Yamamoto; Kanji Takeda; Hiroshi Itaya, all of Chiba (JP)

(73) Assignee: Kawasaki Steel Corporation (JP)

( * ) Notice: Subject to any disclaimer, the term of this patent is extended or adjusted under 35 U.S.C. 154(b) by 0 days.

(21) Appl. No.: 09/412,523

(22) Filed: Oct. 5, 1999

Related U.S. Application Data

(62) Division of application No. 09/280,326, filed on Mar. 29, 1999, now Pat. No. 6,126,718.

(51) Int. Cl.⁷ .................................................. C22B 1/216
(52) U.S. Cl. ........................................... 266/178; 266/190
(58) Field of Search ............................ 266/171; 432/120, 432/135, 136

(56) References Cited

U.S. PATENT DOCUMENTS

| | | |
|---|---|---|
| 1,153,782 | 5/1969 | D. Young . |
| 1,868,952 | 7/1932 | K. M. Simpson . |
| 1,885,381 | 11/1932 | K. M. Simpson . |
| 3,443,931 * | 5/1969 | Beggs et al. . |
| 3,770,417 | 11/1973 | Kranz . |
| 3,947,621 | 3/1976 | Collin et al. . |
| 5,186,741 * | 2/1993 | Kotraba et al. . |

FOREIGN PATENT DOCUMENTS

WO99/20801    4/1999   (WO) .

* cited by examiner

*Primary Examiner*—George Wyszomierski
*Assistant Examiner*—Janelle Combs-Morillo
(74) *Attorney, Agent, or Firm*—Austin R. Miller

(57) ABSTRACT

A traveling hearth for producing reduced metal by charging and stacking a raw material containing a metal-containing material and a solid-reducing material on a horizontally moving hearth, arranged for disposing a solid-reducing material layer on the hearth, forming concave portions at the solid-reducing material surface, stacking the raw material on the surface of the solid-reducing material layer, reducing the raw material by at least once heating and melting the material on the hearth to separate metal and gangue and ash ingredients, and discharging metal from the hearth.

6 Claims, 14 Drawing Sheets

CROSS SECTIONAL VIEW ALONG A-A'

PRIOR ART

METHOD OF PRODUCING A REDUCED METAL, AND TRAVELING HEARTH FURNACE FOR PRODUCING SAME

RELATED APPLICATION

This is a divisional application out of U.S. application Ser. No. 09/280,386 now U.S. Pat. No. 6,126,718 filed Mar. 29, 1999, which in turn is based upon Japanese Applications No. 11-026739 filed Feb. 3, 1999 and No. 10-141227 filed May 22, 1998.

BACKGROUND OF THE INVENTION

1. Field of the Invention

This invention concerns apparatus for of producing reduced and purified metal from a metal-containing raw and at least partially oxidized material. More particularly, this invention relates to an apparatus capable of a novel technique of charging and stacking metal-containing material on a hearth that is moving in a furnace, for heating and reducing the metal-containing material by heating during movement of the hearth. The apparatus at this invention continuously produces reduced metal of high quality from a traveling hearth furnace, with unexpected economy and efficiency.

2. Description of the Related Art

Steels are generally produced either by a converter or an electric furnace. Electric furnace steels are produced by heating and melting scrap or reduced iron by using electrical energy, followed optionally by refining the same. However, since the supply of scrap has become scarce and the demand for high quality steels has increased more and more in recent years, reduced iron has been used more than scrap.

As one reduced iron process, the method of the traveling hearth furnace has been known. One example is shown in Japanese Patent Unexamined Publication Sho 63-108188. Iron ores and solid reducing materials are charged onto a hearth moving in a horizontal direction, and the iron ores are heated and reduced by radiant heat transfer from above, to produce reduced iron. As shown in FIG. 1 of that Japanese publication, charged raw material can be heated during horizontal movement of the hearth. The hearth is usually adapted to rotate as shown, and the hearth furnace is usually referred to as a rotary hearth furnace.

As shown in FIG. 1(a) of the drawings of this application, the rotary hearth furnace has an annular hearth body partitioned into a preheating zone 10a, a reducing zone 10b and a cooling zone 1d, located along the supply side to the discharge side of the furnace. An annular hearth 11 is supported in the furnace body so as to move rotationally.

As shown in FIG. 1(b) of the drawings, a raw material 2 comprising a mixture, for example, of iron ore and solid reducing material, is charged. Pellets having incorporated carbonaceous material are preferably used. The hearth 11 has refractory applied on the surface thereof, or granular refractory may be stacked. A burner 13 is disposed in an upper portion of the furnace body, and metal-containing oxides such as iron ores stacked on the hearth 11 are reduced by heating in the presence of the reducing material into reduced iron by using the burner 13 as a heat source.

In FIG. 1(a) of the drawings, the number 14 represents a feed device for charging the raw material onto the hearth, and 15 denotes a discharge device for the reduced product.

In the usual operation of a traveling hearth furnace, the atmospheric temperature in the furnace body 10 is preferably about 1300° C. The reduced product after completion of the reducing treatment is cooled at the cooling zone 10d (FIG. 1(a)) on the rotating hearth 11, for preventing reoxidation and facilitating discharge from the furnace.

In the operation of the traveling hearth of Japanese Patent Unexamined Publication Sho 63-108188), in conducting the reducing reaction between the iron ore and the solid reducing material, improved productivity is intended to be obtained by decreasing the thickness of the raw material layer and increasing the moving speed of the hearth. However, serious problems arise, as will be detailed hereinafter.

The usual metal-containing materials, for example iron ores, contain a great amount of a gangue ingredient, although this varies depending on the place of production. Coal, coal char and coke, which are typical solid reducing materials, contain a substantial ash ingredient. Accordingly, if the reduced iron is produced only by a reduction reaction, it is inevitable that a great amount of gangue remains in the reduced iron product. Further, ashes adhere to the reducing material and contaminate the reduced iron.

If reduced iron containing a great amount of gangue and ash are then charged into an electric furnace, the amount of calcium oxide that controls the slag CaO/SiO ratio for dephosphorization and desulfurization is increased. This seriously increases the cost, as well as the amount of electric power used, along with increase of heat energy required for formation of slag.

Further, reduced iron obtained only by a reducing reaction usually contains a substantial number of pores, making the iron highly reoxidizable when stored in atmospheric air. This deteriorates the quality of the product and even suffers from the danger of fire caused by generation of heat upon reoxidation. Further, since the porous reduced iron has a low apparent density due to the presence of pores, it floats on slag when used in an electric furnace, sometimes making it difficult to achieve smooth melting and refining. In addition, if the size of the reduced iron product is too great, it takes a long time to melt it in the electric furnace, thereby slowing the productivity of the electric furnace. Accordingly, it is indispensable to decrease the size of the reduced iron.

Accordingly it has been demanded, in the operation of traveling hearth furnaces, to use iron ores of high quality with the gangue percentage as low as possible, and to use a reducing material having an ash content as low as possible. However, sources of pure iron ores or high quality coals are very scarce and expensive. In fact, materials of low quality have to be used whenever possible.

In view of the background as described above, there is a great need for effectively separating a metallic ingredient such as Fe from the usual gangue ingredient and recovering a metallic ingredient, and to do this in the operation of a traveling hearth furnace.

OBJECTS OF THE INVENTION

An important object of the present invention is to produce a high quality reduced metal of an appropriate size, with low gangue and ash contents, and having a small amount of pores.

Another object of the present invention is to establish a technique for easily producing a reduced metal of high quality at a reduced cost without increasing the use of refractory or electric energy.

A further object of the present invention is to produce a reduced metal having excellent storability and convenience in handling.

It is another object to separate a metal ingredient and a gangue ingredient completely, and to separate reduced iron and gangue and the ash, by melting as a part of a reducing operation, with molten metal and molten slag formed in a reducing operation.

BRIEF DESCRIPTION OF THE INVENTION

For solving the foregoing problems in the prior art, there is provided in the present invention, apparatus for of producing a reduced metal from a metal-containing reducible material, by charging a raw material containing the metal-containing material and a solid reducing material on a horizontally moving hearth of a traveling hearth furnace, and heating the raw material during movement of the hearth in the furnace to obtain a reduced metal, wherein the raw material is charged and stacked on the hearth, and heated to a molten condition at least once.

Another feature of the invention comprises apparatus for forming a solid reducing material layer on the hearth, charging and stacking the raw material in the form of separate stacks on the solid reducing material layer, reducing the material by heating, and melting the product at least once.

Still another feature of the present invention resides in apparatus for melting the reduced material at least once to make molten metal and molten slag, and cooling the thus obtained molten metal and molten slag to make a plurality of individual solid metal and solid slag objects while arranging them in a generally spotwise configuration, separated from each other on the surface of the reducing material layer.

Another feature of the invention resides in apparatus for stacking the raw reducible material on top of the solid reducing material layer that lies on the hearth surface, so as to form a plurality of convex and concave portions on the surface of the solid reducing material layer, subsequently reducing the reducible material by heating, and melting the same at least once, and then cooling the thus obtained molten bodies to form a plurality of solid objects while keeping them in a spotwise arrangement, spaced apart from each other on the surface of the reducing material layer.

Yet another feature of the present invention resides in apparatus for forming a solid reducing material layer on the hearth, charging and stacking the raw metallic material on top of the solid reducing material layer, then forming a plurality of concave cups or cup-like portions on the surface of the solid reducing material layer, then charging and stacking the raw material on top of the solid reducing material layer, reducing the same by heating, melting the raw reducible material at least once, and cooling the thus obtained molten contents in the cups while keeping them in a scattered, spotwise arrangement in the cups of the reducing material layer.

In operating the apparatus of the present invention, a flux is preferably introduced into or dispersed on the surface of the solid reducing material layer covering the hearth.

In operating the apparatus of the present invention, a further layer which is not softened nor melted under the existing heating conditions is preferably disposed in the solid reducing material layer covering the surface of the hearth, at least on the surface of the hearth.

In operating the apparatus of the present invention, the thickness of the layer of the solid reducing material covering the hearth is preferably about 5 mm or more, preferably about 10 mm or more.

In the present invention, different kinds of raw materials may be laminated to form a stacked layer when the raw material is charged and stacked on the solid reducing material layer.

In the present invention, agglomerates of metals and slags resulting from the process may be sieved from the reduced products, and powdery materials passing through the sieve may be entirely or partially mixed with further raw materials for reuse.

In the present invention, the raw material preferably contains Zn and/or Pb in the metal-containing material, for reasons further explained hereinafter.

In the present invention, a reducing atmosphere is preferably formed and maintained in the traveling hearth furnace, at least in the region where the raw material is melted.

In the present invention, it is preferred that materials other than the solid reducing material in the raw material may be preheated outside of the traveling hearth furnace, mixed with the solid reducing material and then charged into the traveling hearth furnace.

Raw metallic reducible materials used in the operation of the apparatus of the present invention may include iron ores, Cr ores, Ni ores, iron sand, reduced iron powder, blast furnace dusts, steel-making dusts, stainless refining dusts and iron making sludges containing metals such as iron, Ni and Cr. Further, coal char, coke, non-coking coal and anthracite can be used as the solid reducing material.

Each of the metal-containing materials and the solid reducing materials may be used alone or as a mixture of two or more materials. The metal-containing materials and the solid reducing materials are mixed and used as raw materials to be charged.

The weight ratio of the solid reducing material in the raw material is preferably about 50% or less. Reduction of common metal-containing material can be sufficiently achieved if the solid reducing material is mixed into the raw material up to about 50 weight %. Further, reduced products often become small in the size because of hindrance of gathering of the metal and the slag in case more reducing material than necessary is mixed into the raw material. Therefore, the weight ratio of the solid reducing material in the raw material is preferably about 30% or less in case the produced metals are expected to be within the desired size limitations.

An auxiliary raw material may be added to the reducible raw material for facilitating melting of the reduced metal and ash ingredient during melting. Such auxiliary raw material may be steel making slag, limestone, fluorspar, serpentine, dolomite and the like.

The reducible raw material can desirably be used in the form of a powder of about 8 mm or less or briquettes or pellets previously agglomerated with the powder, but other forms of the material may be used.

The solid reducing material layer is preferably laid entirely on the hearth; it may be the same reducing material as that mixed with the reducible raw material, or a different solid reducing material composition.

The grain size of the solid reducing material may be controlled to such a size that the molten material preferably does not penetrate the solid reducing material layer and does not penetrate down to the hearth refractory upon melting of the raw material. For this purpose, a powder of about 8 mm or less can be used. More preferably, this may be controlled to about 5 mm or less.

The raw material charged on the solid reducing material layer formed on the hearth is reduced by heating and, with further heating, is melted to form metal and slag. In this process, the raw material is preferably charged by being uniformly stacked substantially on the entire surface of the hearth, in the interest of heat transmission efficiency.

When the raw material is heated and melted and separated into metal and slag, the metal and the slag respectively coagulate and are dispersed spotwise on the surface of the solid reducing material layer because of surface tensions of their own. For reliably attaining such spotwise dispersion of the metal and the slag, the spotwise presence and separate containment of the metal and the slag are preferably ensured by physically forming concave cup-like depressions on the upper surface of the solid reducing material layer, and gathering the metal and the slag in the concave cup-like depressions. Upon cooling, separate bodies of solid metal and solid slag remain, and can be collected separately.

The amount of the reducible raw material to be charged in the hearth is variable, depending upon many factors.

Usually, upon melting, the volume of the molten metal and the slag shrinks to about 10–60 vol % based on the original volume of the reducible raw material. Accordingly, the raw material can be charged in an amount up to about ten times the entire volume of the inner spaces in the concave cup-like portions desired to be formed on the upper surface of the solid reducing material layer. Desirably, the amount of raw material charged into the furnace is limited to such an extent that the molten metal and slag substantially fill the insides of the concave cup-like portions when the concave portions are formed on the surface of the solid reducing material layer.

Further, according to the present invention, the traveling hearth furnace comprises a horizontally moving hearth, an enclosure disposed above and covering the hearth, a charging device for charging a material to be charged containing a metal-containing material and a solid reducing material on the hearth, a heating means for heating the material on the hearth, a cooling means for cooling reduced product and slag, and a discharging means for discharging the cooled reduced metal product and the slag. The furnace preferably includes a preheating zone for preheating the material to be charged, a reducing zone for reducing the material to be charged, a melting zone for melting and reducing the material, and a cooling zone for cooling the molten reduced product and the slag.

Particularly, it is preferred to form the upper surface of the hearth and the inner lateral surface of the furnace body with refractory to provide a structure capable of withstanding a high temperature in the furnace.

A heating means may be disposed in the furnace. For example, a burner for fuel gas or liquid fuel may be disposed in the enclosure above the hearth in the furnace to heat directly the material to be processed, using heat of combustion or heat transferred from the inner wall of the furnace body to heat the charged material by radiation. As an alternative method, heating may be applied, partially or entirely, by an electric heater disposed adjacent to the hearth or the furnace wall.

The preheating zone, the reducing zone, the melting zone and the cooling zone may be established by properly controlling the temperature in the furnace without providing specific physical partitioning, but it is preferred to provide partitioning that does not hinder the movement of the hearth or the material charged thereon to the boundary between each of the melting zone and the cooling zone or the reducing zone for effectively maintaining a high temperature in the melting zone.

Figure 1A:
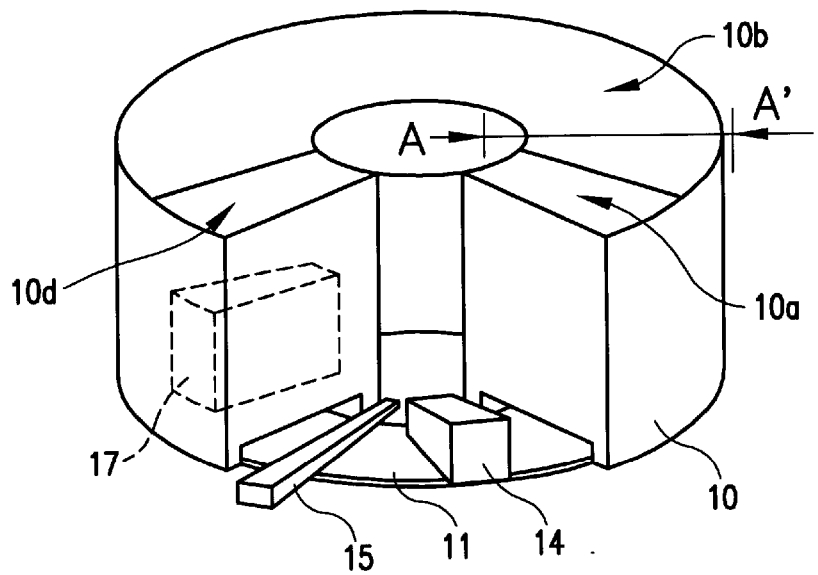
FIGS. 1(a) and 1(b) are explanatory views of a traveling hearth furnace, used in the Japanese publication sho 63-108188, FIG. 1(a) being in perspective and FIG. 1(b) showing portions of the furnace in section.

In the drawings, the reference numerals are as follows: 1: Solid reducing material layer; 1a: Concave portion of solid reducing material layer; 2: Raw material; 2a: Powder mixture as a raw material; 3: Reduced product; 4: Metal; 5: Slag; 10, 10': Furnace body; 10a: Preheating zone; 10b: Reducing zone; 10c: Melting zone; 10d: Cooling zone; 11, 11': Hearth; 13, 13': Burner; 14: Charging device; 14-1: Charging device of solid reducing material; 14-2: Charging device of raw material; 14-3: Roller having convex portions; 15: Discharging device; 16: Lifting device; 17: Cooler; 18: Crusher; 21: Raw material (lower layer); and 22: Raw material (upper layer).

DESCRIPTION OF PREFERRED EMBODIMENTS OF THE INVENTION

The "reducible material" referred to herein may be any metallic raw material that is capable of being reduced.

Typical examples include iron ore, or Cr ores, Ni ores, iron sand, iron powder, blast furnace dust, steel-making dust, stainless refining dust, and iron-making sludges containing metal such as Fe, Ni and Cr, for example.

In the present invention, since the raw material containing the reducible material and the solid reducing material are charged on a hearth, the raw material is reduced by heating and then melted at least once, the metal in the reduced product can be easily separated mechanically from the slag. Accordingly, when the reduced metal is used as a starting material, for example, as feed into an electric furnace, since the slag is not present, less calcium oxide is needed to control the slag $CaO/SiO_2$ ratio for dephosphorization and desulfurization, in the electric furnace operation.

Further, in the present invention, when particles of the solid reducing material are supplied so as to be laid entirely on the hearth to form a solid reducing material layer, and the raw reducible material is stacked on the solid reducing material layer, a carbon source can be always supplied from the solid reducing material layer on the hearth to the metal-containing material in the raw material, particularly, to the molten metal, even after the solid reducing material in the raw material has been thoroughly consumed by the reducing reaction, and the reduced product (metal) is not reoxidized.

This means that a reducing atmosphere is always present just above the raw material layer and the reduced product layer, even when an oxidizing gas might be stagnating in the upper portion of the furnace. With such constitution, the reduced metal can always be produced stably even if furnace operations for the reduction and melting should become changed. Further, if the raw material includes a segregation step and the solid reducing material in the raw material is insufficient locally, the carbon content can be supplemented by carbon from the solid reducing material layer just beneath the stacked layer of the raw material, and the reducing reaction can take place smoothly.

Furthermore, presence of the solid reducing material layer prevents direct contact between the molten metal of the reduced product and the hearth. This prevents erosion of the hearth by the molten metal.

Furthermore, it is important in the present invention that the reduced product is physically dispersed in a multiplicity of so-called island patterns to make a multiplicity of discrete products, each of an appropriate size, on the hearth—created by the spotwise dispersion. That is, the materials are so arranged that the molten reduced product, even after re-solidification on the hearth, is dispersed as a multiplicity of islands that are separate from each other, so that individual coagulation products have small sizes and reduced weights, allowing them to be discharged easily from the furnace and collected.

Further, when large re-solidified products are discharged to the outside of the furnace, they tend to exert an impact shock on the hearth. However, individual solidified "island portions" are smaller and reduced in weight, and give an impact shock that is sharply decreased, reducing the danger of injuring the hearth.

Further, for discharging the solidification products of the formed metal and slag to the outside of the furnace, it is necessary that the furnace body has a discharge port of a size at least larger than each solidified product, or an opening for locating a discharging device for discharging the products. The sizes of discharge ports can be decreased as the size of the products is smaller, to facilitate sealing between the inside and the outside of the furnace.

It is effective, to assure the spotwise presence of a multiplicity of reduced-size metallic products, to form a plurality of concave portions in the upper surface of the solid reducing material layer. This is because the raw material charged into and stacked on the solid reducing material layer is reduced by heating and further melted to form metal and slag, and the metal and the slag are solidified by cooling and solidified separately, having been moved by surface tension into each of the concave portions on the surface of the solid reducing material layer.

In the raw material charged and stacked on the hearth or on the solid reducing material layer, the volatile substances contained in the raw material are converted into waste gases during heating-reduction, and oxygen contained in metal oxide is also reduced by the solid reducing material and converted into waste gases. Accordingly, what remains on the hearth are the molten metal ingredient, the gangue ingredient such as $SiO_2$ and $Al_2O_3$ and the solid reducing material.

A preferred embodiment of the present invention will now be explained with reference to the drawings.

Prior to charging of the raw material, granular solid reducing material is scattered on the rotationally moving hearth to form a solid reducing material layer. The solid reducing material layer formed on the hearth can basically be an aggregate of reducing materials. Since this reducing layer is not mixed with the metal-containing reducible material, it scarcely changes except for the loss of volatile matter during operation. Usually, the solid reducing material contains about 10% ash but most of the balance comprises a carbonaceous material and maintains a solid state even at a high temperature of about 1000 to 1500° C. Accordingly, the solid reducing material layer itself does not fuse to the refractory on the upper surface of the traveling hearth. It functions as a protective layer for the refractory on the hearth.

On the solid reducing material layer, a mixture of the metal-containing material and additional solid reducing material is charged and stacked. Stacking may be accomplished in a variety of ways, as hereinafter described, to create a multiplicity of islands of reducible metallic raw material, individually dispersed separately from each other, in the body of the solid reducing material. An alternative is a mixture of the metal-containing material, the solid reducing material and auxiliary raw material. Reduction is caused by heating during rotational movement of the hearth in the furnace. The reduced material is further heated until it is melted, and the reduced product (metal and slag) formed is dispersed spotwise in an island pattern as heretofore described. This means that reduced metal arranged into a predetermined product size can be produced continuously.

FIG. 2(a), FIG. 2(b), FIG. 2(c) and FIG. 2(d) of the drawings are views of examples of raw material laminate structures on the hearth in a traveling hearth furnace. They assist in understanding the process of reduction and melting.

Figure 1B:
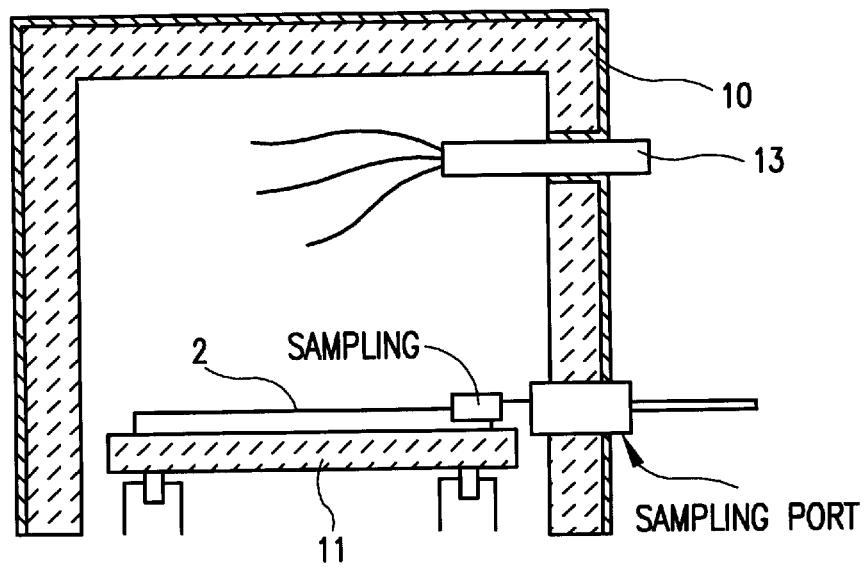
Figure 2:
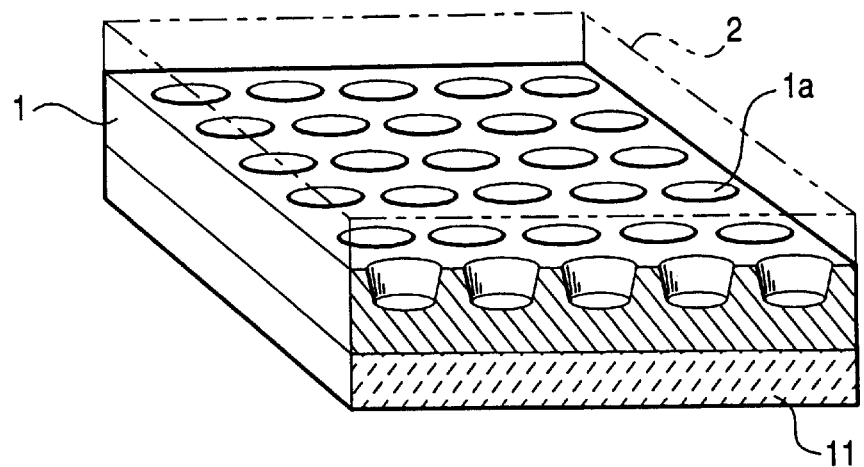
FIGS. 2(a), 2(b), 2(c) and 2(d) are explanatory views in perspective in accordance with this invention, showing sequential steps of stacking of raw material on a hearth applicable to the present invention and changes of state upon reducing the raw material and melting the reduced product.
Figure 2:
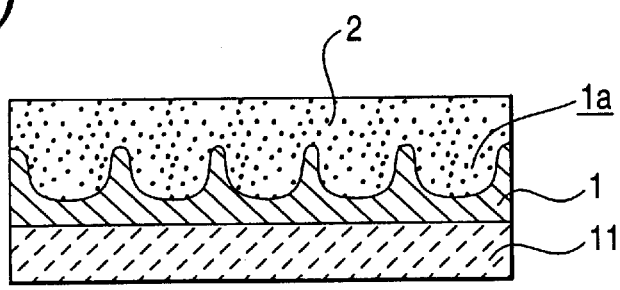
Figure 2:
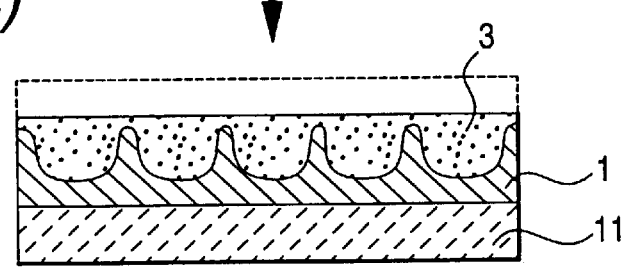
Figure 2:
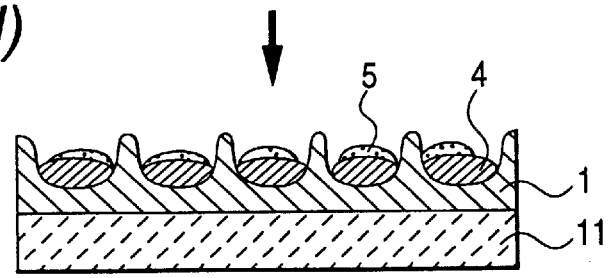

Referring to FIG. 2(a), a solid reducing material 1 is. at first laid on the surface of the moving hearth 11 to cover the surface with solid reducing material layer 1, and a plurality of concave cup-like portions or pockets 1a are preferably formed on the upper surface of the solid reducing material layer 1. Then, the raw material 2 is charged as in FIG. 2(b) and stacked in the pockets 1a and on the thus formed solid reducing material layer 1. Subsequently, reduction takes place by heating using (for example) a burner 13 (FIG. 1(b)) at an upper portion of the furnace body. As a result, as shown in FIG. 2(c), the metal-containing material in the raw material 2 shrinks under the effect of the solid reducing material (incorporated carbonaceous material) mixed together, to form a reduced-size product 3 containing the gangue and, at the same time, to form a slag mainly comprising the ash of the solid reducing material used as the reducing material contained in the raw reducible metallic material. Since the solid reducing material in the raw reducible metallic material is consumed by the reduction reaction (although the extent may differ depending on the blending method of the raw material and the metal-containing material and solid reducing material to be used), the volume of the reduced product and the ash containing gangue (reduced product 3 of FIG. 2(c)) is decreased, compared with that of the original raw reducible material.

Auxiliary raw metallic material may preferably be added to the main raw material for facilitating melting of the reduced product and the ash. Steel making slag, limestone, fluorspar, serpentine, dolomite and the like are suitable examples. Although this introduction causes evaporation of combined water and decomposition reaction of a portion (for example, $CaCO_3$ as the main ingredient of limestone is thermally decomposed into CaO) before melting, but they remain in a solid state.

Then, as the heating of the raw material proceeds further, the raw material and the auxiliary raw material are not merely reduced but start melting and, as shown in FIG. 2(d), are melted and separated into metal 4 and slag 5. Since the raw material comprising the metal-containing material and the solid reducing material, or the raw material comprising a mixture of the metal-containing material, the solid reducing material and the auxiliary raw material are dispersed spotwise in the cups or depressions in the solid reducing material layer 1, the metal 4 and the slag 5 are formed in the cups in the solid reducing material layer 1. In this case, as shown in FIG. 2(d), when concave portions or cups 1a are formed on the surface of the solid reducing material layer 1, the metal 4 as the reducing product and the slag 5 are spontaneously moved to and contained in various ones of the cup-shaped concave portions 1a of the solid reducing material layer 1 by surface tension and gravity, and are physically divided into units corresponding to each concave portion 1a on the solid reducing material layer 1. Lumps of the metal 4 and the slag 5 are present spotwise in a so-called island pattern.

As described above, when the reduced product is dispersed in concave portions 1a formed in the solid reducing material layer, the metal and the slag are formed in an appropriate size for further handling. In addition, since the volume of the thus formed metal and slag is only about 10 to 60% of the volume of the raw material, they are arranged spotwise, buried in the solid reducing material, so that they are not in contact with each other.

Since the specific gravity of the metal and the slag is higher than that of the solid reducing material layer 1, it may be considered that they submerge under the solid reducing material layer 1. However, the metal and the slag actually form individual small lumps and, due to the effect of surface tension, they remain on or near the surface of the solid reducing material layer.

The slag and the metal thus formed on the rotational moving hearth reach the cooling zone and are cooled. This separates solid lumps of slag 5 from solid lumps of reduced metal 4. All this time the solidified metal and the solidified slag are kept apart from the hearth by the presence of the underlying solid reducing material layer. They form individual small lumps, and can be discharged easily from the furnace.

If the surface of the solid reducing material layer 1 is made in a flat shape without forming concave portions, the metal and the slag after cooling would not be divided and sometimes may form larger lumps. In such a case a crusher for crushing the metal and the slag on the hearth may be necessary upon discharging from the furnace. Accordingly, it is preferred that concave portions are formed, preferably on the surface of the solid reducing material layer 1.

This has been confirmed also by experiments conducted by the inventors regarding the surface shape of the solid reducing material layer. In these experiments, powdery iron ores, powdery cokes and limestones each of a grain size of 8 mm or less were mixed at a 7:3:1 by weight ratio to form a powder mixture as the raw material. Then, concave and convex portions were formed on the surface of the solid reducing material layer 1 made of powdery cokes on the basis of the material lamination condition shown in FIGS. 3(a) and 3(b), on which a powdery mixture 2 was stacked, which was placed in an experimental apparatus as shown in FIG. 4, kept at a temperature of 1480 to 1500° C., and reduced and melted to form metal and slag. The results of the experiment are shown in Table 1. FIG. 4 shows an example of the apparatus used for the experiment. It had a structure in which a hearth 11' was vertically moved by a lifting device 16 and placed in a furnace body 10'. The solid reducing material layer 1 and the material deposition layer 2a formed on the hearth 11' were heated by a burner 13', exposed to the same thermal hysteresis as described above, and reduced and melted.

Figure 5:
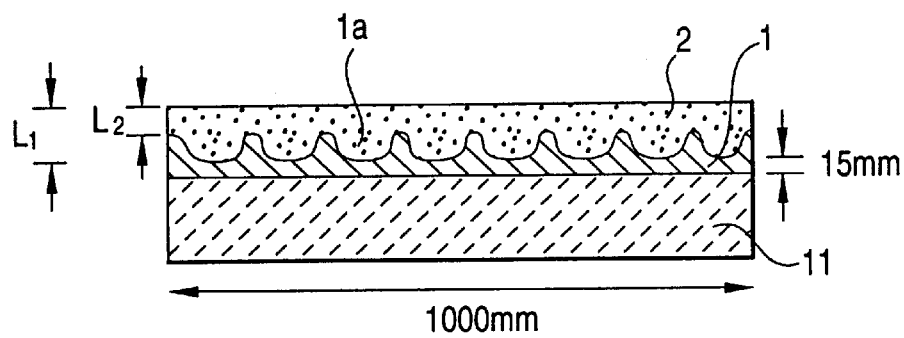
FIGS. 5(a) and 5(b) are explanatory views of lamination conditions in another experiment in accordance with this invention.
Figure 5:
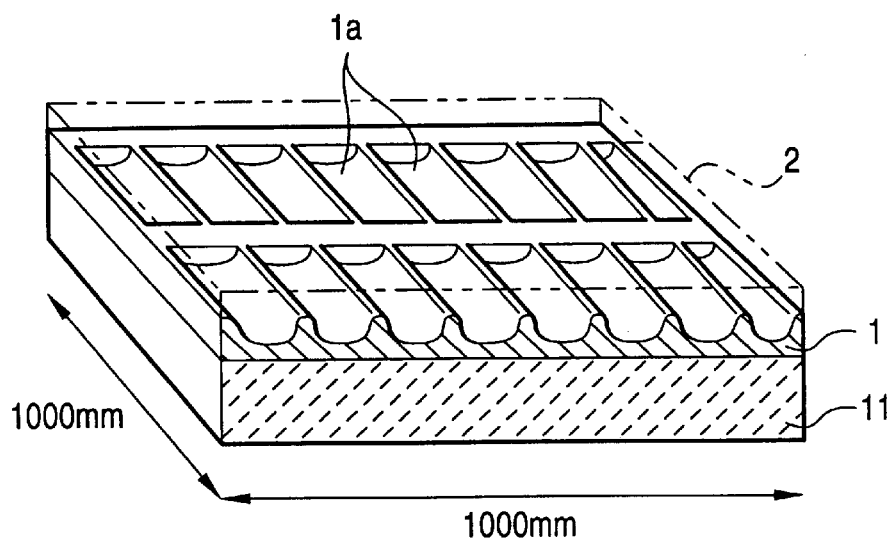
Figure 6:
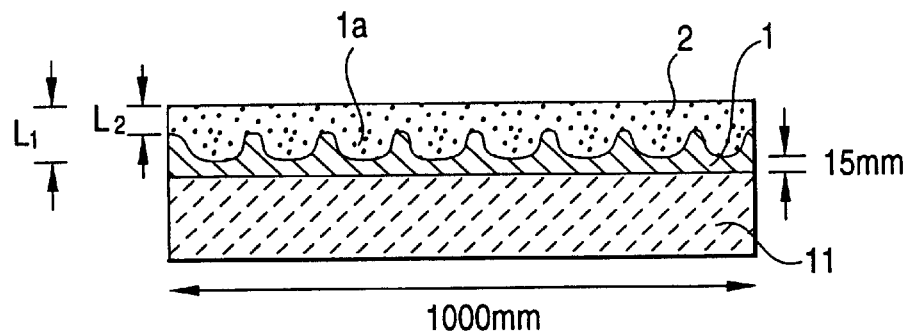
FIGS. 6(a) and 6(b) are similar explanatory views showing lamination conditions in an alternative experiment in accordance with this invention.
Figure 6:
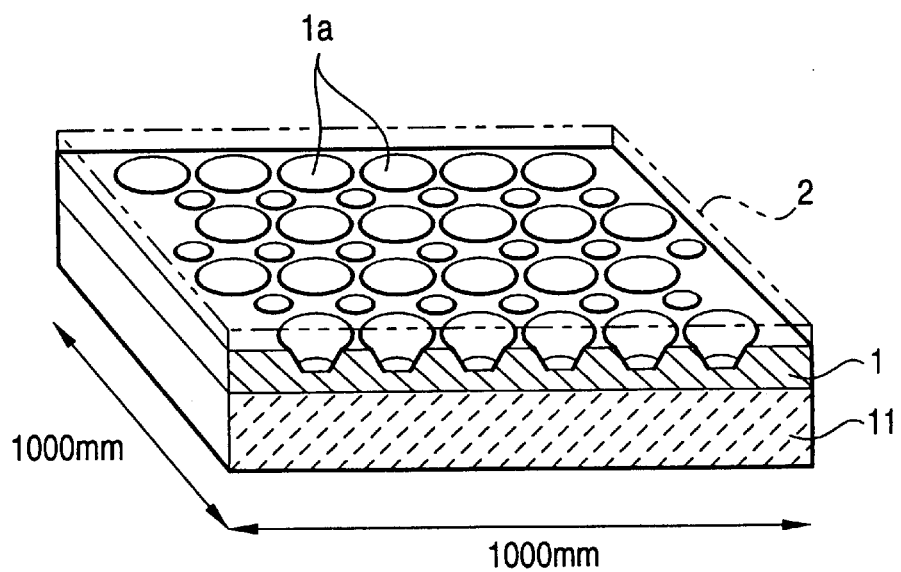

Regarding the shape of the concave portions formed in the solid reducing material layer 1, experiment was conducted also on a square shape molding 2" as shown as an alternative in FIGS. 5(a) and 5(b). The same was done on a combination of circular shapes of depressions 1(a) of different sizes, as shown in FIGS. 6(a) and 6(b). In Table 1, the expression "hole shape" means the shape and size of the concave portion or cup-shaped depression formed in the solid reducing material layer 1. "L" in Table 1 shows the diameter of a circle having an area identical with that of the hole of the shape (equivalent circle diameter). In a case of forming various different shapes as in the raw material lamination condition of FIGS. 6(a) and 6(b), the maximum value among them is shown.

Figure 3:
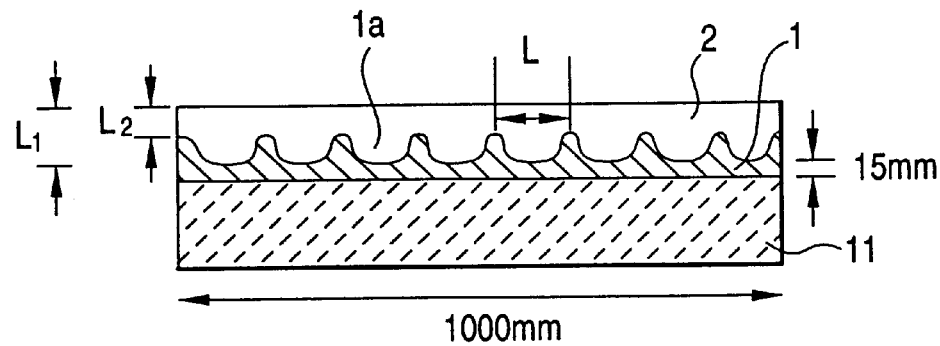
FIGS. 3(a) and 3(b) are, respectively, in section and in perspective explanatory views of one form of lamination condition used in an experiment hereinafter described in accordance with this invention.
Figure 3:
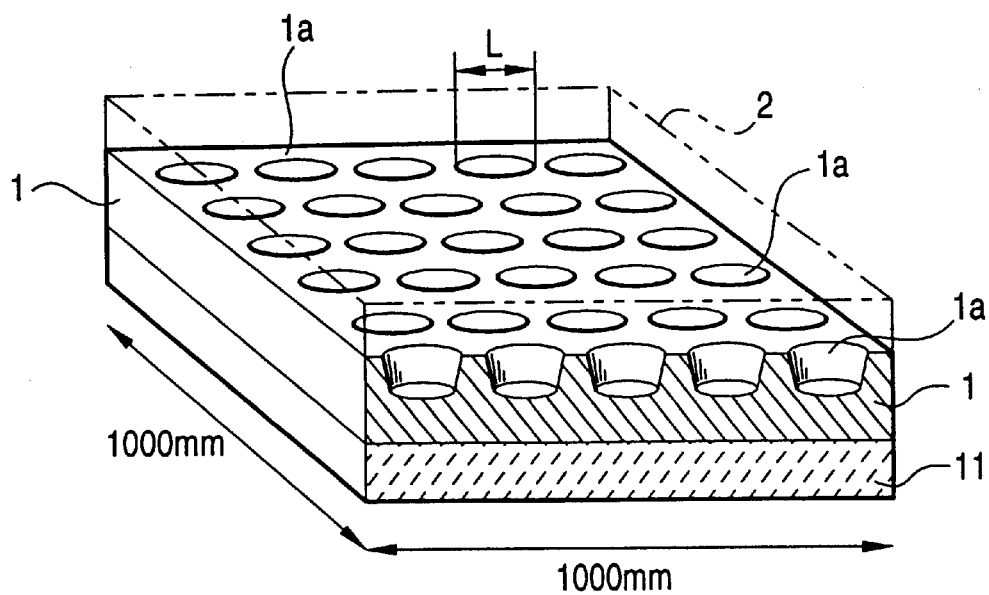
Figure 4:
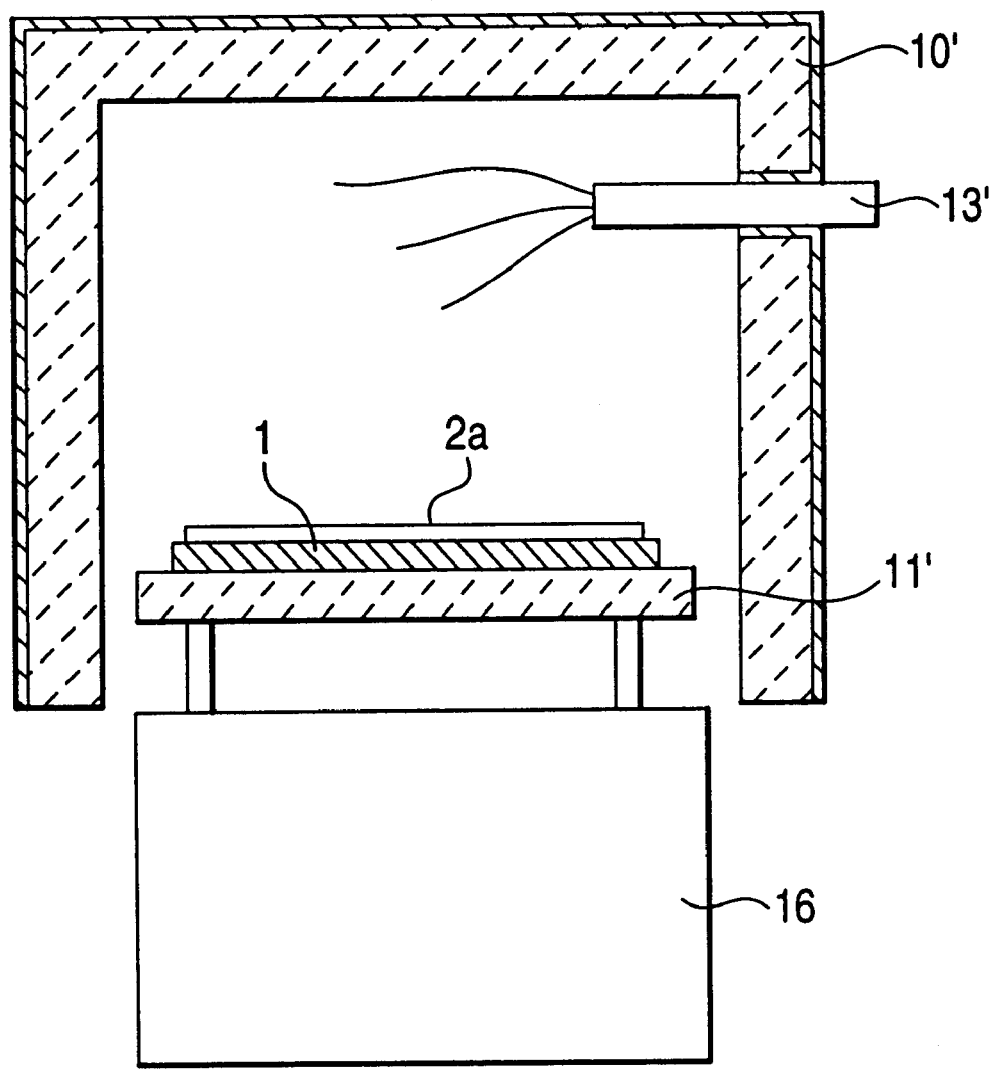
FIG. 4 is an explanatory sectional view, with parts shown in section, of apparatus for heating used in the experiment of FIGS. 3(a) and 3(b).

Each of FIGS. 3(a), 5(a) and 6(a) shows the cross-sectional shape of a concave portion 1a formed on the surface of the solid reducing material layer 1, which includes the greatest layer thickness $L_1$ of the material powder and the smallest layer thickness $L_2$ of the raw material at the convex portion on the surface of the solid reducing material single layer. As shown in Table 1, after the experiment, separate lumps of metal were obtained in a dispersed form in each of the resulting concave portions.

TABLE 1

|   | Temp. (° C.) | Raw material lamination condition | Hole shape (mm) | L (mm) | L1/ L2 (-) | Shape of metal after experiment (mm) |
|---|---|---|---|---|---|---|
| 1 | 1500 | 1 | Round 50 | 50 | 1.1 | Round 46–52 |
| 2 | 1500 | 1 | Round 50 | 50 | 1.2 | Round 44–52 |
| 3 | 1500 | 1 | Round 50 | 50 | 1.5 | Round 45–53 |
| 4 | 1480 | 1 | Round 50 | 50 | 1.1 | Round 43–51 |
| 5 | 1480 | 1 | Round 50 | 50 | 1.2 | Round 48–54 |
| 6 | 1500 | 1 | Round 80 | 80 | 1.4 | Round 61–83 |
| 7 | 1500 | 1 | Round 100 | 100 | 1.4 | Round 83–92 |
| 8 | 1500 | 1 | Round 300 | 300 | 1.4 | Round 248–291 |
| 9 | 1500 | 1 | Round 300 | 300 | 1.2 | Round 231–285 |
| 10 | 1500 | 2 | Square 185 × 50 | 109 | 1.4 | Rod-shape, length 161–176, width 43–51 |

TABLE 1-continued

| Temp. (° C.) | Raw material lamination condition | Hole shape (mm) | L (mm) | L1/ L2 (-) | Shape of metal after experiment (mm) |
|---|---|---|---|---|---|
| 11 | 1500 | 2 | Square 360 × 100 | 214 | 1.4 | Rod-shape, length 342–361, width 88–97 |
| 12 | 1500 | 3 | Round 200 & 50 | 200 | 1.4 | Round 183–190, 36–42 |

NOTE:
Lamination conditions 1 appears in FIGS. 3(a) and 3(b).
Lamination conditions 2 appears in FIGS. 5(a) and 5(b).
Lamination conditions 3 appears in FIGS. 6(a) and 6(b).

Each method formed a plurality of concave portions on the surface of the solid reducing material layer comprising solid reducing material particle laid uniformly to a predetermined thickness. This is a fundamental mode for forming the solid reducing material layer on the hearth. This forming method can reliably form a multiplicity of concave portions, select easily from a variety of applicable shapes, and is effective if periodicity is required for the concave portions. A roller or a plate with a plurality of convex portions on its lower surface is suitably usable. Transfer of the surface pattern of the roller or the plate to the surface of a solid reducing material layer makes it possible to form a plurality of concave portions on the surface of a solid reducing material layer.

Another alternative method of stacking in accordance with this invention comprises laying particles of a solid reducing material on a hearth to a constant layer thickness, dropping raw material lumps of briquette-like shape from above, thereby forming concave portions as a product of the resulting impact shock and, further, charging other metal-containing material and solid reducing material between the stacked briquettes to form a stacked layer having a predetermined layer thickness, and having concave portions spaced apart from each other as heretofore described.

A method comprising dropping a mixture of raw material lumps and another fine raw material onto the surface of the solid reducing material layer can be used.

A still further stacking method involves preliminarily laying a solid reducing material entirely as an underlayer, and charging and stacking a raw material, onto the surface thus obtained, a solid reducing material layer of a predetermined layer thickness, stacked so as to form a plurality of uneven protuberances on the surface of the raw material stacked layer. That forms unevenness by controlling a stacked layer of the charged raw material instead of forming the concave portions 1a of the solid reducing material layer 1 on the hearth floor. It can perform substantially the same function and achieve substantially the same effect as the embodiments previously mentioned. After melting, metal and slag generated around the convex portions of the raw material stacked layer are gathered to the metals the slags generated at the convex portions by surface tension. Accordingly, the metals the slags are kept present spotwise and held on the surface of the solid reducing material layer. Therefore, the same function and effect can be substantially attained. Charging and stacking raw material lumps onto the surface of the solid reducing material layer dispersed as island patterns attain substantially the same function and effect.

The solid reducing material layer laid on the hearth serves as a carburizing source for the molten metal, and supplies carbon to the molten metal, compensates reducing reactions of the raw material, and prevents direct contact between the molten matter and the hearth. Further, it prevents erosion of the hearth by the molten matter.

Accordingly, so long as substantially these functions are ensured, the solid reducing material layer may contain other materials than the carbonaceous material. For example, the solid reducing material layer may be mixed uniformly with a flux or as a gradient blending of non-uniform concentration, or the flux may be applied only on the surface of the solid reducing material layer. The mixed flux serves effectively for reducing the quantity of S in the molten metal by absorption of the S ingredient in the solid reducing layer.

As the constituent ingredients of the solid reducing material layer, coal chars, cokes, non-coking coals, coking coals and anthracites can be used. They contain carbon material, serve as a carburizing source for the molten metal, supply carbonaceous material to the molten metal and compensate the reduction.

Among the solid reducing materials, there are those softened and melted by heating, such as coking coal. They may sometimes shrink subsequently and develop macrocracks, which may result in the possibility that the molten matter on the solid reducing material layer will penetrate to the cracks. However, direct contact between the molten matter and the hearth can be prevented by laying the solid reducing material layer on the hearth, specially in case the solid reduced layer is not softening and not melting at least in a portion contacting with the hearth so as to prevent erosion of the hearth by the molten matter reliably.

Since the softening and melting behavior of the solid reducing material changes, depending on the kind of solid reducing material and the kind of heating pattern, the layer thickness and the kind of carbonaceous material to be laminated are properly selected depending on the operating conditions and the solid reducing material to be used.

The solid reducing material layer has the function and effect as described above. If the amount of the layer laid on the hearth is too small, it cannot sometimes function since it may be consumed by carburization and reduction. Even if it is not consumed, the effect of the layer of solid reducing material on the hearth may possibly be partially lost due to vibrations of the furnace. Therefore, the thickness of the solid reducing material layer laid on the hearth is desirably about 5 mm or more and, more preferably, about 10 mm or more in order to prevent direct contact between the molten matter and the hearth, and to ensure the prevention of erosion of the hearth by the molten matter.

When the raw material containing the metal-containing material and the solid reducing material is charged and stacked on the solid reducing material layer, not only the raw material of a single species need be stacked to a predetermined layer thickness but also different kinds of raw materials may be laminated in a multi-stage arrangement. For instance, a reducing metal can be obtained with no trouble by laminating a raw material, comprising a fairly reduced metal-containing material and a solid reducing material at a blending ratio enough to reduce metal-containing material, on the surface of the solid reducing material layer and laminating a raw material comprising a metal-containing material and a different solid reducing material. In the case of the fairly reduced metal-containing material, reduction proceeds more rapidly than usual, the melting and carburization occur sooner, and reduction and melting in the upper layer are promoted since melting starts therefrom to assist the effect of the present invention.

Further, in charging the raw material, the raw material is segregated intentionally by particle percolation in which large particles are stacked below and smaller particles are distributed thereon in the raw material stacked layer. This charging method is also application example of the present invention.

In the case of multi-stage laminating of different kinds of raw materials, the metal-containing material and the solid reducing material are distributed at different blending ratios. Also, the particular species of metal-containing material and solid reducing material may be varied, using variants such as lamination of blast furnace dry collected dusts at an upper layer, and raw materials containing iron ores and solid reducing material at a lower layer.

The metal and the slag, after cooling, may be crushed on the furnace hearth such that they are easily discharged using a crusher in which lumps of metal and slag are formed. Further, even small lumps of metal and slag, obtained by spotwise holding and cooling the molten particles on the surface of the solid reducing material, may be in part broken to pieces by mechanical processing outside of the furnace. Further, the solid reducing material laid on the hearth may be discharged from the furnace, depending on the recovery method used.

As has been described above, it is most convenient to recover the agglomerates of the metal and the slag by sieving products outside of the furnace. A mixture of powdery metal, powdery slag and powdery solid reducing material can also be obtained after passing through the sieve.

The mixture of the powdery metal or powdery slag and the remaining powdery solid reducing material, after passing through the sieve, may be recovered and added to the raw material to be charged and then supplied again to the furnace, thereby attaining complete recycling of metal, slag and solid reducing material.

Improvement of the recovery ratio of the metal and decrease of the amount of solid reducing material can be attained. When the recovered powders passing through the sieve are charged on the solid reducing material layer, the technique of multistage lamination with different kinds of raw materials may be used.

As another preferred embodiment of the present invention, it is particularly effective to incorporate highly volatile metallic elements such as raw Zn and Pb into the raw material to be charged. This is because Zn and Pb in the raw material are easily vaporized by heating and pass into the waste gases. Then, Zn and Pb ingredients can be recovered effectively by quenching the waste gases, such as with a water blow. When iron, Cr, Ni or the like is also contained in the raw material and will remain on the hearth, the Zn, Pb ingredients and the Fe, Cr, Ni ingredients can be separated spontaneously. Accordingly, when using such raw material, preparation of Zn and Pb of high quality, and preparation of high quality Fe, Cr, or Ni can be achieved.

Zn and Pb may be sometimes reoxidized into a solid state, depending on the temperature of the waste gases and the oxygen partial pressure, but they have extremely small grain sizes and are entrained in the waste gases and discharged from the furnace.

In the furnace operation by the method according to the present invention, when the raw material charged and stacked on the hearth is melted, and if the atmosphere in the furnace is of a reducing nature, the oxygen partial pressure is lowered and carburization of the solid reducing material laid on the hearth to the metal can be conducted rapidly. Furthermore, if the atmosphere is controlled by a carbon containing gas, carburization from an atmospheric gas can also be conducted. This can lower the melting point of the metal to thereby promote melting and increase productivity. Furthermore, the oxygen partial pressure can be lowered to effect the sulfur distribution between the slag and the metal to effectively reduce the percentage of sulfur in the metal.

It is important to form a reducing atmosphere in the furnace. The same effect can be obtained by supplying a reducing gas to cover the raw material layer stacked on the hearth and, particularly, by forming a reducing atmosphere at least for the melting zone. When heating by burner combustion, the atmosphere in the entire furnace may be rendered reducing by adjusting the combustion control of the burner. Also, a reducing gas may be introduced in the vicinity of the material layer surface, using a separate route.

Further, it is effective to preheat the raw material prior to charging it into the furnace. If mixed raw materials are preheated outside of the furnace, the coal may be softened enough to melt, which causes handling problems in the preheating step, depending on the kind of coal used and the preheating temperature.

In such a case, preheating for improvement of productivity may be used entirely or partially except for the solid reducing material in the raw material mainly comprising the metal-containing material and the solid reducing materials at the outside of the traveling hearth furnace, mixing the raw material just before supplying it to the traveling hearth furnace, agglomerating optionally and supplying to the traveling hearth furnace, thereby improving the productivity while avoiding handling problems.

In another preferred embodiment of the present invention, the residence time of the raw material in the furnace, from the feed to the discharge of the raw material, may be as long as about an hour, more or less, although it varies depending on the manner of charging the raw material and the furnace temperature. If the heating of the raw material can be speeded up, productivity of the furnace can be improved. By preheating the raw material, the residence time in the furnace can be shortened.

For heating the traveling hearth furnace, burner combustion can be conveniently employed. The burner may be supplied with fuels such as natural gas, coke furnace gas, heavy oil, or the like, along with combustion gases such as air and oxygen, for example. Preheating of the fuel or the combustion gases by heat exchange with waste gases from the furnace can conserve on fuel to the burner.

When burner combustion is adopted, since the temperature of the waste gases released from the traveling hearth furnace is about 1000° C. or higher, it is preferred to utilize waste gases for preheating the raw material outside of the furnace. This can improve productivity of the furnace as described above, and can eliminate the requirement of supplying energy for preheating the raw material.

The raw material charged in the furnace is melted after reduction. For this operation, it is necessary to provide high-temperature refractory and furnace body structure. This results in increased installation cost. While the reduction of the raw material proceeds faster when the temperature is higher, a practical reducing rate can be ensured even if the temperature is not so high as to cause melting. On the other hand, if the melting zone is unnecessarily short, this slows the moving speed of the hearth in order to ensure the reaction time necessary for melting, thereby lowering productivity. The length of the zone for melting is selected appropriately to considerations of maintenance, productivity and minimization of installation cost.

Products such as metal and slag melted on the hearth are gathered and solidified before discharging from the furnace. Then fuels such as natural gas, coke furnace gas and heavy oils and combustion aids such as air or oxygen supplied to the burner are also able to have a role as cooling medium In this case fuels and combustion aids are preheated and this preheating achieves decrease in production energy. Further, products such as the metal and the slag may be cooled by using, for example, nitrogen or reducing gas, which can also be used for controlling the atmosphere of the furnace during melting.

When the metal and the slag are discharged from the furnace, not only the metal and the slag but also the solid reducing material layer may be discharged partially or entirely depending on the discharging apparatus and method. Alternatively, substantially only the metal and the slag can be discharged, with the bed of solid reducing material left in place on the hearth. When the furnace is a rotary furnace and the solid reducing material is discharged only partially or in a small amount, the solid reducing material is kept without change on the hearth. In this case, the solid reducing material is supplied at the raw material supply section in an amount proportional to any material consumed.

EXAMPLES

Example 1

Figure 7:
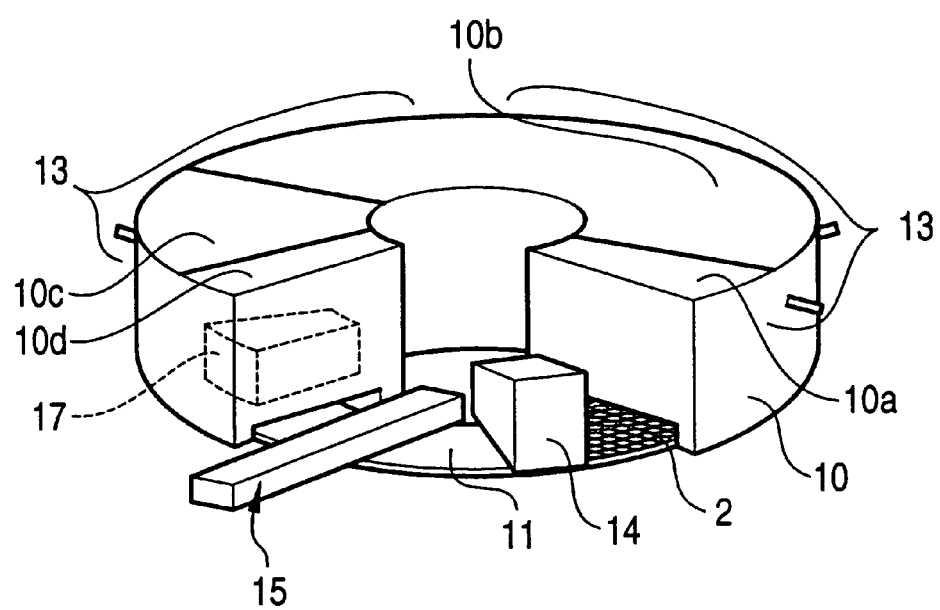
FIG. 7 is an explanatory view, in perspective, showing a traveling hearth furnace used in one example according to this invention.

In this example, the operation described below was conducted using a rotary hearth furnace as shown in FIG. 7. The rotary hearth of 2.2 meter diameter was provided with an alumina refractory on the upper surface (as in FIG. 1(b)) and they were housed in an annular furnace body as in FIG. 1(b), in which a burner is disposed above the hearth.

As shown in FIG. 7, the hearth of the rotary furnace was divided into a preheating zone 10a, a reducing zone 10b, a melting zone 10c and a cooling zone 10d. A raw material layer 2 was formed on the rotary furnace hearth by charging and stacking a raw material mainly comprising an iron-containing material and a solid reducing material. In this facility, reference numerals identical with those shown in FIGS. 1(a) and 1(b) denote similar parts. The number 17 in FIG. 7 denotes a cooler disposed in front of a discharge port for cooling reduced iron and slag.

Figure 8:
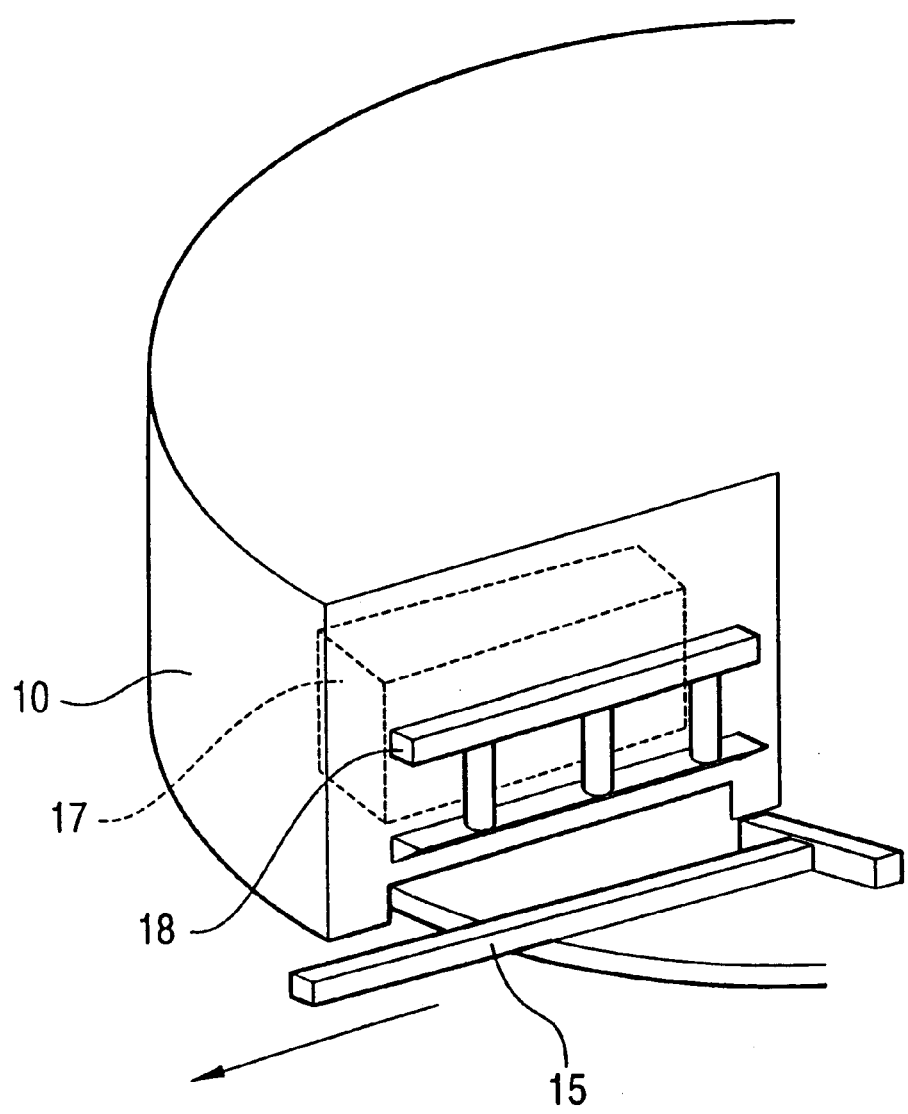
FIG. 8 is an explanatory view, in perspective, with a portion cut away to show important details, showing a discharging device used in an example according to this invention.

FIG. 8 is a schematic view taken near the furnace exit port used for the operation. After discharging solid metal by discharge device 15, the metal and the slag were separated by magnets. A crusher 18 was used optionally, depending on the case.

Figure 9:
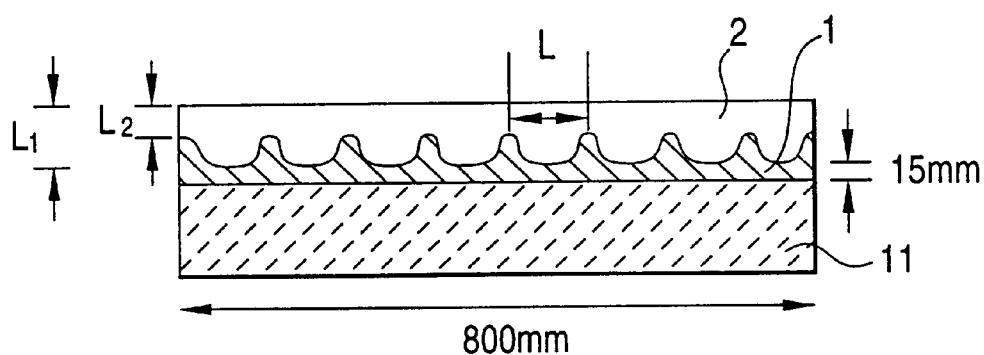
FIGS. 9(a) and 9(b) are explanatory sectional views showing lamination conditions of a raw material used in an example according to this invention, and referred to in Table 4 hereinafter as Lamination Condition A.
Figure 9:
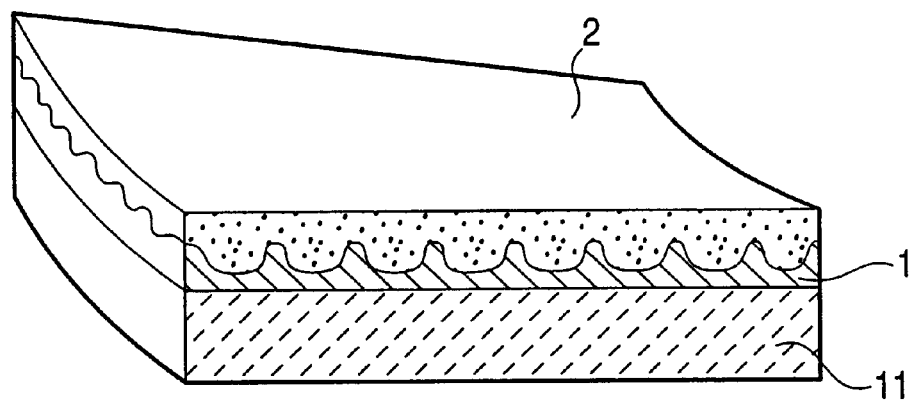

The raw material at the supply port of the furnace was charged and stacked using metal-containing material and a solid reducing material, using the charging device 14. This was done under four sets of conditions shown as lamination examples of the raw material as illustrated in FIGS. 9(a) and (b), FIGS. 10(a) and (b), FIGS. 11(a) and (b) and FIGS. 12(a) and (b). In this case, concave portions were formed on the surface of the solid reducing material layer by pressing a roller having convex portions down on the surface of the solid reducing material layer.

As the metal-containing material, iron ore having compositions as shown in Table 2, containing 7% or more of gangue ingredient ($SiO_2$, $Al_3O_3$, etc.) were used. The solid reducing materials had ingredient compositions shown in Table 3 containing 6 to 11% of ash ingredient. They were used while controlling their mesh sizes to 3 mm or less.

The results are shown in Table 4. Nos. 1 to 6 showing application examples are examples of the present invention. In any of conditions for the examples of the stacked form shown in FIGS. 9(a) and 9(b), the refractory material for the hearth was undamaged. There was no difficulty discharging products. The iron recovery rate for the products was as high as 97.4% or more. The products could be recovered substantially free of gangue and ash ingredients. There was no significant reduction of productivity. In No. 5, a portion in which metal and slag in 2 to 3 concave portions were joined into a larger mass, but there was no particular problem regarding smooth and successful discharge.

Figure 10:
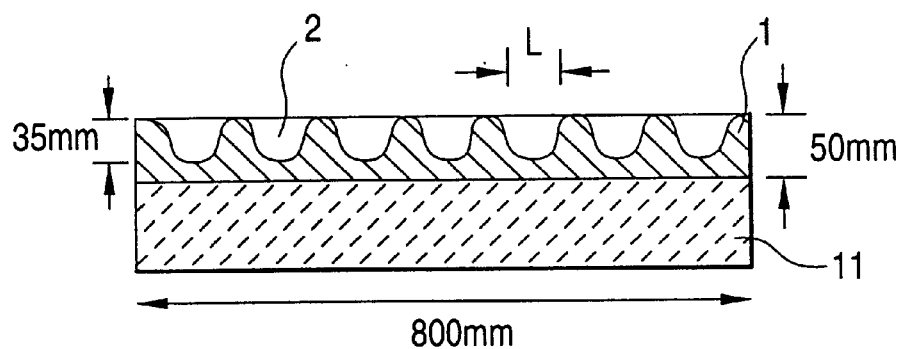
FIGS. 10(a) and 10(b) are explanatory sectional views of another lamination condition of raw material used in an example and referred to in Table 4 hereinafter as Lamination Condition B.
Figure 10:
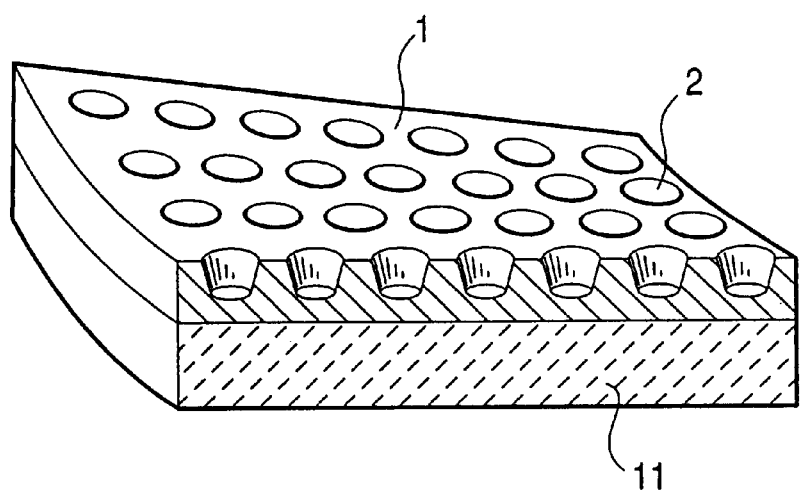

Application Examples Nos. 7 and 8 are examples of stacked shapes of FIGS. 10(a) and 10(b), in which the raw material was partitioned into small areas by the solid reducing material and arranged in a spotwise manner on the solid reducing material layer, so as not to come into direct contact with the hearth. Under the lamination condition, since the reduced iron and the ash were separated by the solid reducing material layer from the hearth refractory, even when they were melted for the purpose of removing gangue and ash ingredient, the hearth refractory was not damaged by the slag and the molten iron. However, since the solid reducing material layer was already exposed to the surface upon stacking, utilization of the radiant heat to this portion, though acceptable, was somewhat lacking, and productivity was somewhat lower as compared with Examples Nos. 1 to 6.

Figure 11:
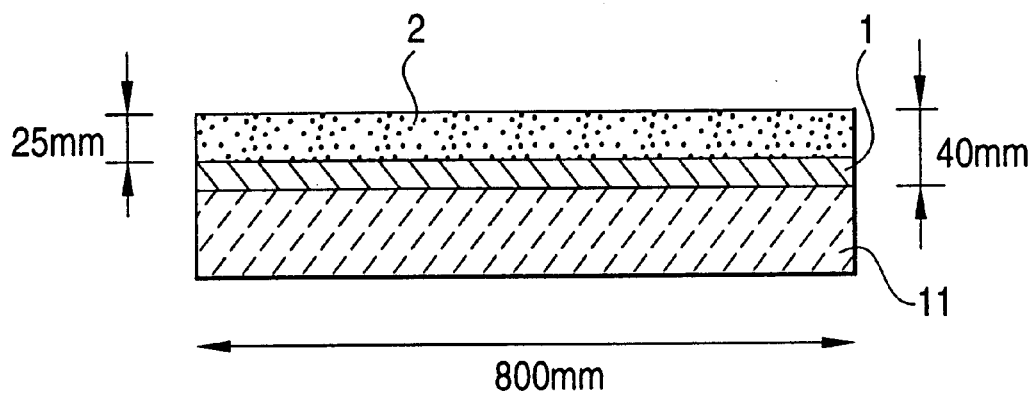
FIGS. 11(a) and 11(b) are explanatory sectional views of an alternative lamination condition of raw material adopted in another example, and referred to in Table 4 hereinafter as Lamination Condition C.
Figure 11:
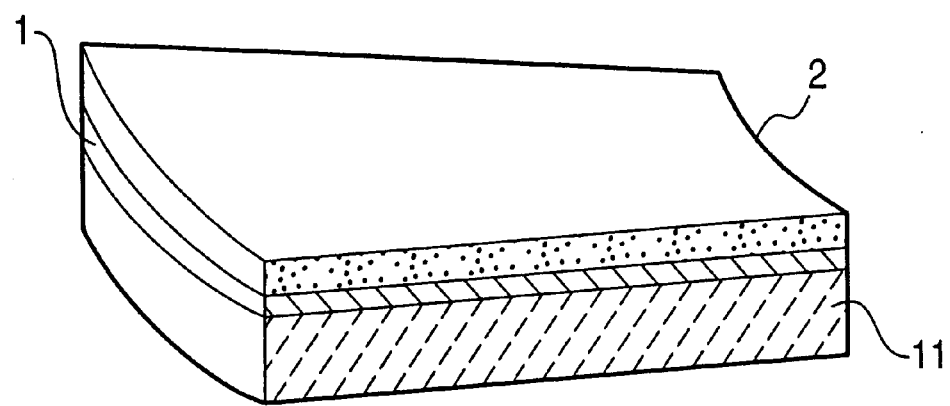

Application Examples Nos. 9 and 10 are examples under lamination conditions shown in FIGS. 11(a) and 11(b), in which a solid reducing material layer 1 had a smooth upper surface and a powdery reducible material mixture was stacked in a layered shape over the layer 1. In these examples, when the reduced iron and the ash were melted for removing gangue or ash ingredients, both the slag and the metal formed into large plate-like shapes and, although being partially cracked due to shrinkage in the cooling process, the metal and the slag after cooling formed large plate shapes, some of which extended from the discharge port to the vicinity of the cooler 17 of FIG. 8.

A crusher was disposed before the discharging device for crushing the products on the hearth before discharging out of the furnace. Although the installation cost and the running cost were increased by the installation of the crusher, the operation was assisted by the crusher and metal was produced.

Figure 12:
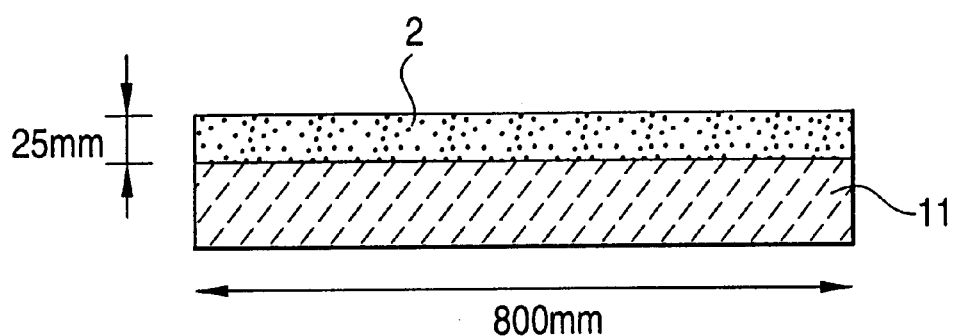
FIGS. 12(a) and 12(b) are explanatory sectional views of another alternative lamination condition of raw material adopted in another example, and referred to in Table 4 hereinafter as Lamination Condition D.
Figure 12:
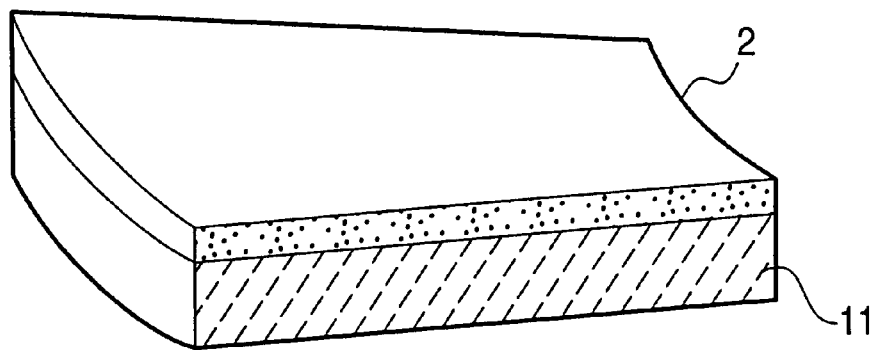

Application Example No. 11 involved lamination as in FIGS. 12(a) and 12(b), in which raw material 2 was placed in a layered shape on the hearth refractory 11 without any intervening solid reducing material layer. The reduced iron and the ash were melted for removing gangue and ash ingredients. Since the raw material was carried directly on the hearth refractory surface, the hearth refractory suffered from melting loss by molten materials. Further, some of the slag and the metal had large plate-like shapes that extended from the discharge port in the vicinity of the cooler 17 in FIG. 8. A crusher was disposed at a side of the discharge device and the products were crushed on the hearth before discharging to the outside of the furnace. Although the installation cost was increased by the installation of the crusher, and the running cost of electric power necessary for the operation of the crusher, and the cost regarding some melting loss of the hearth refractory material increased, the operation was possible and the metal could be produced.

In each of Examples Nos. 1 to 10, the solid reducing material layer 1 at portions in contact with the hearth was not softened and melted near the discharge portion.

TABLE 2

| Combined water (%) | T.Fe (%) | FeO (%) | $SiO_2$ (%) | $Al_2O_3$ (%) | CaO (%) | MgO (%) | P (%) | S (%) |
|---|---|---|---|---|---|---|---|---|
| 3.25 | 62.30 | 0.11 | 4.31 | 2.60 | 0.04 | 0.05 | 0.075 | 0.014 |

TABLE 3

|   |   | Volatile matter (%) | Ash (%) |
|---|---|---|---|
| I | Non-coking coal | 44.5 | 6.6 |
| II | Coal char | 3.0 | 10.4 |

TABLE 4

| | Solid reducing material | | Sub raw | | | | | | | Product | | Pro- | |
| | I (mass %) (1) | II (mass %) (1) | Ore (mass %) (1) | material (limestone) (mass %) (1) | Gangue + ash (mass %) (2) | Lamination condition | L (mm) | $L_1/L_2$ | Damage of hearth refractory | Crusher | Iron recovery rate (%)(3) | Gangue ingredient (mass %) (4) | ductivity (5) kg-DRI/hour | Remarks |
|---|---|---|---|---|---|---|---|---|---|---|---|---|---|---|
| 1 | 26.7 | | 66.3 | 7.0 | 10.3 | A | 50 | 1.2 | none | none | 98.2 | 0.1 | 128 | Application Example |
| 2 | 26.7 | | 66.3 | 7.0 | 10.3 | A | 300 | 1.4 | none | none | 97.9 | 0.1 | 130 | Application Example |
| 3 | | 17.6 | 75.4 | 7.0 | 11.0 | A | 300 | 1.2 | none | none | 98.6 | 0.2 | 126 | Application Example |
| 4 | | 17.6 | 75.4 | 7.0 | 11.0 | A | 50 | 1.4 | none | none | 98.4 | 0.1 | 129 | Application Example |
| 5 | 26.7 | | 66.3 | 7.0 | 10.3 | A | 50 | 1.1 | none | none | 97.8 | 0.2 | 122 | Application Example |
| 6 | 13.4 | 8.8 | 70.8 | 7.0 | 11.0 | A | 200 | 1.4 | none | none | 97.6 | 0.2 | 123 | Application Example |
| 7 | 26.7 | | 66.3 | 7.0 | 10.3 | B | 50 | —(6) | none | none | 97.5 | 0.2 | 105 | Application Example |
| 8 | | 17.6 | 75.4 | 7.0 | 11.0 | B | 50 | —(6) | none | none | 97.6 | 0.2 | 103 | Application Example |
| 9 | 26.7 | | 66.3 | 7.0 | 10.3 | C | — | — | none | used | 97.8 | 0.2 | 124 | Application Example |
| 10 | | 17.6 | 75.4 | 7.0 | 11.0 | C | — | — | none | used | 97.7 | 0.2 | 122 | Application Example |
| 11 | 26.7 | | 66.3 | 7.0 | 10.3 | D | — | — | damaged | used | 95.3 | 1.5 | 119 | Application Example |

(1)Blending ratio in raw material
(2)Ratio of gangue + ash in raw material
(3)Fe content in product relative to total content in raw material
(4)Ratio of other matters than metal intruded in product
(5)Amount of product per 1 hr
(6)Numerical value corresponding to $L_2$ can not be defined for lamination condition (B)
NOTE:
Lamination condition A appears in FIGS. 9(a) and 9(b).
Lamination condition B appears in FIGS. 10(a) and 10(b).
Lamination condition C appears in FIGS. 11(a) and 11(b).
Lamination condition D appears in FIGS. 12(a) and 12(b).

Example 2

The following operation was conducted using the apparatus of Example 1. The raw material was charged and stacked at the supply port of the furnace by the charging device 14 on the rotary hearth 11 under the lamination condition shown in FIGS. 9(*a*) and 9(*b*) (Lamination Condition A). Limestone was added in an amount of 5% by weight into the solid reducing material layer 1. As shown in Table 5, it was found that the percentage of sulfur (S) was lowered in the recovered metal, in cases where limestone was blended with the solid reducing material layer, under substantially the same operation conditions.

TABLE 5

| | Solid reducing material (mass %) (1) | Ore (mass %) (1) | Sub raw material (limestone) (mass %) (1) | Gangue + ash (mass %) (2) | Limestone in solid reducing material layer (mass %) (3) | Lamination condition | L (mm) | $L_1/L_2$ | [% S] (mass %) (4) | Productivity kg-DRI/hour (5) | Remarks |
|---|---|---|---|---|---|---|---|---|---|---|---|
| 12 | 17.6 | 75.4 | 7.0 | 11.0 | 0 | A | 50 | 1.2 | 0.72 | 126 | Application Example |

TABLE 5-continued

| | Solid reducing material (mass %) (1) | Ore (mass %) (1) | Sub raw material (limestone) (mass %) (1) | Gangue + ash (mass %) (2) | Limestone in solid reducing material layer (mass %) (3) | Lamination condition | L (mm) | $L_1/L_2$ | [% S] (mass %) (4) | Productivity kg-DRI/hour (5) | Remarks |
|---|---|---|---|---|---|---|---|---|---|---|---|
| 13 | 17.6 | 75.4 | 7.0 | 11.0 | 5.0 | A | 50 | 1.2 | 0.49 | 125 | Application Example |
| 14 | 17.6 | 75.4 | 7.0 | 11.0 | 5.0 | A | 50 | 1.4 | 0.53 | 129 | Application Example |

(1)Blending ratio in raw material
(2)Ratio of gangue + ash in raw material
(3)Ratio of limestone contained in solid reducing material layer
(4)Ratio of sulfur contained in metal product
(5)Amount of product per 1 hr Example 3

Figure 13:
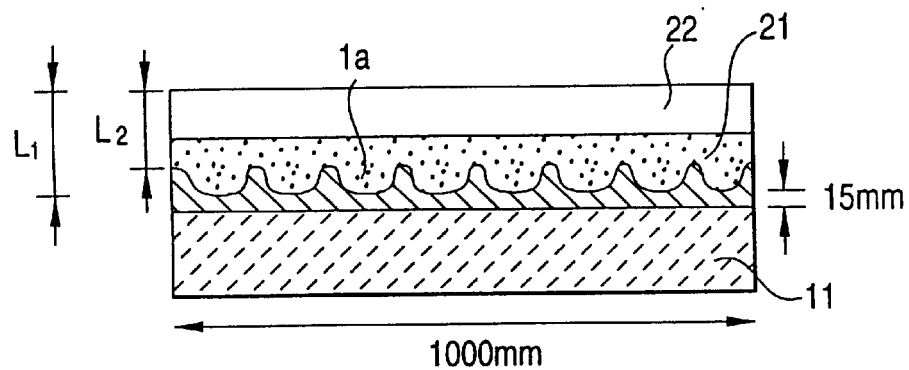
FIGS. 13(a) and 13(b) are further explanatory views of a lamination condition of raw material adopted in Example 3 herein.
Figure 13:
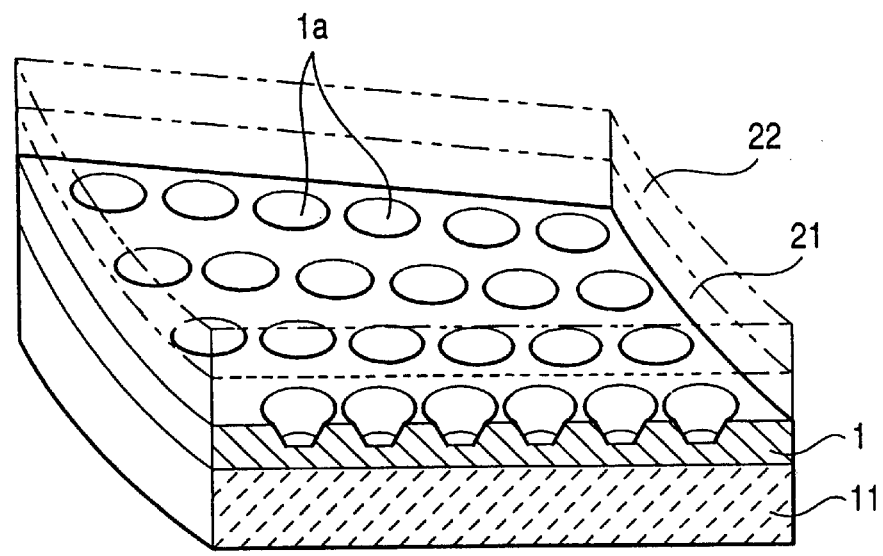

Using the apparatus of Example 1, the following operation was conducted. The raw material was stacked at the supply port of the furnace by the charging device 14 under the lamination condition or in the multi-layer form for the raw material in FIGS. 13(*a*) and 13(*b*). In these figures, the raw material (lower layer) 21, and the raw material (upper layer) 22 were different in the blend, as shown in Table 6. In Application Example 16, not only the iron-containing material in Table 2 but also powdery pig iron in Table 7 were blended as metal-containing materials to the raw material (lower layer) 21. As shown in Table 6, good production was achieved even at a high rotational speed, under the condition of blending the powdery pig iron to the raw material (lower layer) 21, where the amount of iron charged per unit area was identical and the operation conditions other than the rotational speed of the furnace were substantially identical. The production speed was accordingly increased. In the Application Example 17, blast furnace dry collection dust in Table 9 was used for the raw material upper layer 22 and the identical material as that in Application Example 16 was used for the raw material lower layer 21.

Since the properties of the raw material in the upper layer were different, the productivity could not be compared directly, but production was conducted with no trouble.

TABLE 6

| | | Solid reducing material (mass %) (1) | Ore (mass %) (1) | Sub raw material (lime-stone) (mass %) (1) | Pig iron (mass %) (1) | Blast furnace dry collected dust (mass %) (1) | Gangue + ash (mass %) (2) | Iron charged amount (kg/m²) (3) | Lami-nation condition | L (mm) | $L_1/L_2$ | Rotational speed RPM (4) | Remarks |
|---|---|---|---|---|---|---|---|---|---|---|---|---|---|
| 15 | | 17.6 | 75.4 | 7.0 | 0.0 | 0.0 | 11.0 | 23.1 | A | 50 | 1.2 | 0.050 | Application Example |
| 16 | Upper layer | 17.6 | 75.4 | 7.0 | 0.0 | 0.0 | 11.0 | 10.9 | A | 50 | 1.2 | 0.058 | Application Example |
| | Lower layer | 15.8 | 67.9 | 6.3 | 10.0 | 0.0 | 9.9 | 12.2 | | | | | |
| 17 | Upper layer | 0.0 | 0.0 | 0.0 | 0.0 | 100.0 | 12.9 | 10.5 | A | 50 | 1.2 | 0.055 | Application Example |
| | Lower layer | 15.8 | 67.9 | 6.3 | 10.0 | 0.0 | 9.9 | 12.6 | | | | | |

(1)Blending ratio in raw material
(2)Ratio of gangue + ash in raw material
(3)Charging amount of iron contained in each of raw material layers per unit hearth area
(4)Number of rotations of hearth per minute

TABLE 7

| C (%) | Si (%) | Mn (%) | P (%) | S (%) |
|---|---|---|---|---|
| 3.2 | 0.33 | 0.32 | 0.13 | 0.021 |

Example 4

The following operation was conducted using the apparatus of Example 1. The raw material was charged and stacked at the supply port of the furnace by the charging device 14 on the rotary hearth 11 under the lamination condition shown in FIGS. 9(a) and 9(b) (Lamination Condition. A). After discharging products formed on the solid reducing material layer by the discharging device 15, they were entirely sieved on a 3 mm sieve. The entire fractions passing the sieve were mixed to the raw material and recycled. The amount recycled to the raw material was 1.5 to 2% of the raw material. As shown in Table 8, the metal recovery rate was increased when the operation conditions were substantially identical.

TABLE 8

| | Solid reducing material (mass %) (1) | Ore (mass %) (1) | Sub raw material (limestone) (mass %) (1) | Recycled raw material (mass %) (2) | Iron recovery ratio (mass %) (3) | Iron charged amount (kg/m$^2$) (4) | Rotational speed RPM (5) | Remarks |
|---|---|---|---|---|---|---|---|---|
| 18 | 17.6 | 75.4 | 7.0 | 0.0 | 98.6 | 23.1 | 0.050 | Application Example |
| 19 | 17.6 | 75.4 | 7.0 | 1.57 | 99.8 | 23.5 | 0.054 | Application Example |
| 20 | 17.6 | 75.4 | 7.0 | 2.05 | 99.7 | 23.6 | 0.053 | Application Example |

(1) Blending ratio in raw material excluding recycled raw material
(2) Ratio of recycled raw material returned to the raw material based on the entire raw material
(3) Fe content in product based on entire Fe in the raw material excluding recycled raw material
(4) Charged amount of iron contained in raw material layer per unit hearth area
(5) Number of rotations of hearth per minute Example 5

The following operation was conducted using the apparatus of Example 1. In this example, water was sprayed into the waste gases from the furnace to cool the waste gases and trap and recover dust in the waste gases. The raw material was stacked by the charging device 14 on the hearth 11 under the lamination condition shown in FIGS. 9(a) and 9(b) (Lamination Condition A). The raw material used in this example was dry collected dust from a blast furnace containing Zn and Pb in addition to Fe as the metallic ingredients. Further, the dry collected dust contained a portion of the coke charged to the blast furnace. The composition is shown in Table 9. As a result, ZnO and metallic Pb were recovered in secondary dust trapped in the water. The Fe ingredient was scarcely present in the secondary dust. Further, most of metals melted, coagulated and recovered in the furnace were Fe, Zn and Pb were not present at all.

TABLE 9

| | t.Fe | FeO | SiO$_2$ | CaO | Al$_2$O$_3$ | MgO | Zn | Pb | S | C |
|---|---|---|---|---|---|---|---|---|---|---|
| Dry collected dust from blast furnace | 43.5 | 1.72 | 6.00 | 3.20 | 3.15 | 0.54 | 1.13 | 0.52 | 0.74 | 19.7 |

TABLE 10

| | Dry collected dust from blast furnace (mass %) (1) | Iron charged amount (kg/m$^2$) (2) | Rotational speed RPM (3) | Pb (%) in metal (mass %) (4) | Zn (%) in metal (mass %) (4) | Fe (%) in secondary dust (mass %) (5) | Remark |
|---|---|---|---|---|---|---|---|
| 21 | 100.0 | 21.4 | 0.050 | <0.01 | <0.01 | <0.01 | Application Example |

(1) Blending ratio in raw material
(2) Charged amount of iron contained in raw material layer per unit hearth area
(3) Number of rotations of hearth per minute
(4) Ratio contained in product metal
(5) Ratio contained in recovered secondary dust

Example 6

The following operation was conducted using the apparatus of Example 1. In this example, the temperature in the melting zone was compensated by combustion of a pure oxygen-propane burner and the degree of oxidation of the waste gases after combustion was adjusted by controlling the air ratio. The raw material was stacked by the charging device 14 on the rotary hearth 11 under the lamination conditions shown in FIGS. 9(a) and 9(b) (Lamination Condition A). The results of the operation are shown in Table 11. The productivity was increased somewhat by increasing the reducing property of the atmosphere where the degree of oxidation of the gas after combustion, namely, the reducing property of the atmosphere, and the operation conditions other than the rotational speed of the furnace, were substantially identical.

TABLE 11

| | Solid reducing material (mass %) (1) | Ore (mass %) (1) | Sub raw material (limestone) (mass %) (1) | Gangue + ash (mass %) (2) | Lamination condition | L (mm) | $L_1/L_2$ | Productivity kg-DRI/ hour (3) | Melting zone gas CO (%) | Melting zone gas $CO_2$ (%) | Remarks |
|---|---|---|---|---|---|---|---|---|---|---|---|
| 22 | 17.6 | 75.4 | 7.0 | 11.0 | A | 50 | 1.2 | 126 | 1.2 | 42.0 | Application Example |
| 23 | 17.6 | 75.6 | 7.0 | 11.0 | A | 50 | 1.4 | 140 | 37.0 | 8.0 | Application Example |

(1) Blending ratio in raw material
(2) Ratio of gangue + ash in raw material
(3) Amount of product per 1 hr

Example 7

Figure 14:
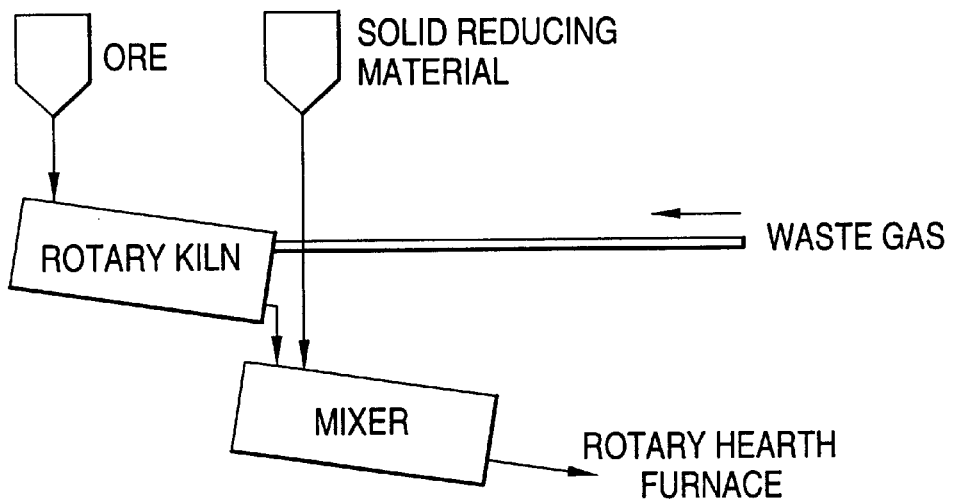
FIG. 14 shows a preheating device for a raw material as adopted in Example 7 herein.
Figure 15:
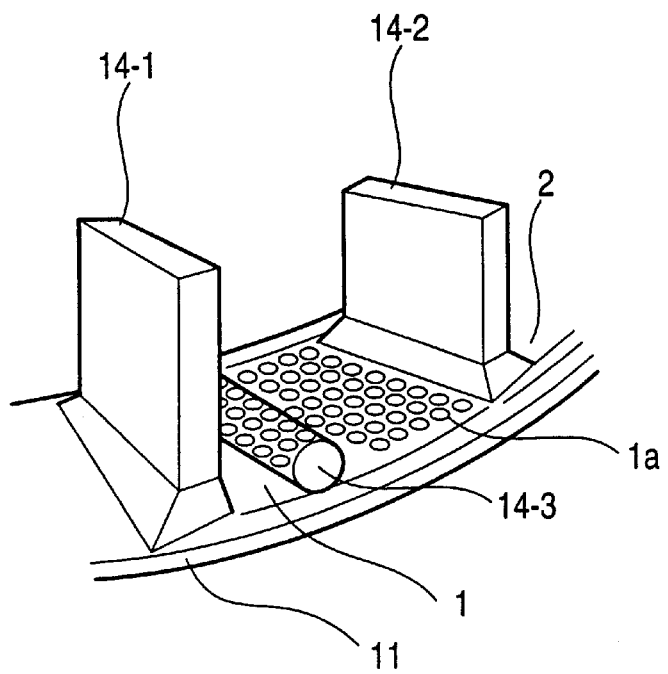
FIG. 15 is a detailed view of charging device used in one example according to this invention shown in FIG. 7.

The following operation was conducted using the apparatus of Example 1. In this example, a rotary kiln type preheating device with a one-meter inner diameter and a three-meter length was used as shown in FIG. 14, in which waste gases from the traveling hearth furnace was introduced. together with ores and the ores were preheated by the waste gases. The temperature of the waste gases was changed from 1000° C. to 1100° C., and the preheated ores were heated to about 500° C. The preheated ores were introduced into a mixer (1 m inner diameter, 3 m length), mixed with a solid reducing material (coal in Table 12) at a normal temperature and then stacked by the charging device 14 shown in FIG. 7 on the hearth 11 of the traveling hearth furnace under the lamination conditions shown in FIGS. 9(a) and 9(b). The results of the operation are shown in Table 13. In an operation not preheating the ores, the energy charged to the burner fuels and consumed solid reducing material was 7.0 Gcal/t-metal, whereas the required energy was reduced to about 6.8 Gcal/t-metal when using the thus preheated ores.

TABLE 12

| Volatile matter (%) | Ash (%) |
|---|---|
| 32.1 | 9.6 |

TABLE 13

| | Preheating operation | Solid reducing material Table 3 II (mass %) (1) | Solid reducing material Table 12 (mass %) (1) | Ore (mass %) (1) | Sub raw material (limestone) (mass %) (1) | Gangue + ash (mass %) (2) | Lamination condition | L (mm) | $L_1/L_2$ | Productivity kg-DRI/ hour (3) | Charged energy Gcal/t-metal | Remarks |
|---|---|---|---|---|---|---|---|---|---|---|---|---|
| 24 | No | 17.6 | | 75.4 | 7.0 | 11.0 | A | 50 | 1.2 | 126 | 7.0 | Application Example |
| 25 | Yes | | 22.7 | 70.4 | 7.0 | 11.0 | A | 50 | 1.4 | 141 | 6.8 | Application Example |

(1) Blending ratio in raw material
(2) Ratio of gangue + ash in raw material
(3) Amount of product per 1 hr As has been described above according to the present invention, reduced iron with no substantial impurities of gangue and ash, namely, reduced iron highly evaluated as a raw material to be further refined in an electric furnace or the like, was obtained inexpensively and reliably from a metal-containing material and a solid reducing material by the use of a traveling hearth furnace. Further, damage to the hearth can surprisingly be avoided by forming a solid reducing material layer on the hearth itself. Furthermore, handling of the reduced metal is radically improved by forming the reduced metal in a spotwise manner on the solid reducing material layer on the hearth, thereby enabling the industry to create a reduced metal in controllable product sizes that is very suitable as a raw material for further processing in electric furnaces.

What is claimed is:

1. A traveling hearth furnace comprising a horizontally moving hearth, a hearth body disposed above and covering said hearth, a charging device positioned for charging on said hearth combined materials comprising a reducible metal-containing material and a solid reducing material on the hearth, a heating means for heating said combined materials on the hearth to reduce said metal-containing material and make a reduced metal and a slag, and being capable of reducing said metal when heated, to produce said metal plus slag, said charging device and heating means being positioned and operative to form a pattern of spaced depressions in said upper surface of an solid-reducing material, a cooling means for cooling said reduced product and said slag, and a discharging means positioned and operative for discharging said cooled reduced product and said slag, wherein, a preheating zone provided in said furnace for preheating said combined materials to be charged, a reducing zone provided in said furnace for reducing said metal-containing material charged, a melting zone provided in said furnace for melting and reducing said metal-containing material, and a cooling zone provided in said furnace for cooling said molten reduced product and said slag, and wherein said cooling zone is disposed in said furnace between said charging device and said discharging device.

2. A traveling hearth furnace comprising a horizontally moving hearth, a hearth furnace disposed above and covering said hearth, a charging device positioned and operative for charging combined materials comprising a metal-containing material and a solid carbonaceous reducing material on said hearth, said charging device being positioned and operative to form a pattern of pocket depressions in an upper surface of said solid-reducing material, a heater in said furnace positioned for heating said combined materials on said hearth to reduce said metal-containing material and make a reduced product and a slag in said pocket depressions, and to provide a reducing atmosphere just above said metal-containing material, a cooler positioned for cooling said reduced product and said slag, and a discharger positioned and operative for discharging said cooled reduced product and said slag, wherein, there are further a preheating zone provided in said furnace for preheating said combined materials to be charged, a reducing zone provided in said furnace for reducing said metal-containing material charged, a melting zone provided in said furnace for melting and reducing said metal-containing material, and a cooling zone provided in said furnace for cooling said molten reduced product and said slag, and wherein said cooling zone is disposed in said furnace between said charging device and said discharging device.

3. A moving hearth furnace as defined in either of claims 1 or 2, wherein said furnace further comprises a charging device positioned and operative to charge a solid-reducing material in a manner to provide a solid-reducing material layer which substantially completely covers said hearth, said layer having an upper surface having a multiplicity of spaced-apart depressions, and to charge said combined materials on said solid-reducing material layer.

4. The apparatus defined in claim 2, wherein said charging device is positioned and operative to deposit upon said hearth a layer of a solid-reducing material which substantially covers said hearth, and to deposit upon said layer an upper deposit of said metal-containing material, thereby preventing direct contact between said hearth and the molten metal generated by said heating of said metal-containing material.

5. A traveling hearth furnace comprising a horizontally moving hearth, a hearth disposed above and covering said hearth, a charging device positioned for charging combined materials comprising a metal-containing material and a solid carbonaceous reducing material on said hearth, heating said combined materials on said hearth to reduce said metal-containing material and make a reduced product and a slag, and to provide a reducing atmosphere just above said metal-containing material, a cooler cooling said reduced product and said slag, and a discharger positioned and operative discharging said cooled reduced product and said slag, wherein, a preheating zone provided in said furnace for preheating said combined materials to be charged, a reducing zone provided in said furnace for reducing said metal-containing material charged, a melting zone provided in said furnace for melting and reducing said metal-containing material, and a cooling zone provided in said furnace for cooling said molten reduced product and said slag, and wherein said cooling zone is disposed in said furnace between said charging device and said discharging device, wherein said charging device is positioned and operative to deposit upon said hearth a layer of a solid-reducing material which substantially covers said hearth, and to deposit upon said layer an upper deposit of said metal-containing material, thereby preventing direct contact between said hearth and the molten metal generated by said heating of said metal-containing material, wherein said charging device is positioned and operative to form a pattern of pocket depressions in said upper surface of said solid-reducing material layer.

6. A traveling hearth furnace comprising a horizontally moving hearth, a hearth disposed above and covering said hearth, a charging device positioned for charging combined materials comprising a metal-containing material and a solid carbonaceous reducing material on said hearth, heating said combined materials on said hearth to reduce said metal-containing material and make a reduced product and a slag, and to provide a reducing atmosphere just above said metal-containing material, a cooler cooling said reduced product and said slag, and a discharger positioned and operative discharging said cooled reduced product and said slag, wherein, a preheating zone provided in said furnace for preheating said combined materials to be charged, a reducing zone provided in said furnace for reducing said metal-containing material charged, a melting zone provided in said furnace for melting and reducing said metal-- containing material, and a cooling zone provided in said furnace for cooling said molten reduced product and said slag, and wherein said cooling zone is disposed in said furnace between said charging device and said discharging device, wherein said charging device is positioned and operative to deposit upon said hearth a layer of a solid-reducing material which substantially covers said hearth, and to deposit upon said layer an upper deposit of said metal-containing material, thereby preventing direct contact between said hearth and the molten metal generated by said heating of said metal-containing material, comprising apparatus for pressing a roller having convex portions down on the surface of said solid-reducing material layer.

\* \* \* \* \*

UNITED STATES PATENT AND TRADEMARK OFFICE
CERTIFICATE OF CORRECTION

PATENT NO. : 6,224,820 B1
DATED : May 1, 2001
INVENTOR(S) : Sawa et al.

Page 1 of 1

It is certified that error appears in the above-identified patent and that said Letters Patent is hereby corrected as shown below:

Title page,
Item [54], please change the Title from "METHOD OF PRODUCING A REDUCED METAL, AND TRAVELING HEARTH FURNACE FOR PRODUCING SAME" to -- APPARATUS FOR PRODUCING A REDUCED METAL, AND TRAVELING HEARTH FURNACE FOR PRODUCING THE SAME --.

Column 1,
Line 15, please delete "of" before "producing".

Signed and Sealed this

Eleventh Day of December, 2001

Attest:

*Attesting Officer*

NICHOLAS P. GODICI
*Acting Director of the United States Patent and Trademark Office*